(12) United States Patent
Su et al.

(10) Patent No.: US 12,067,288 B2
(45) Date of Patent: *Aug. 20, 2024

(54) STORAGE DEVICES INCLUDING A CONTROLLER FOR HANDLING COMMAND SEQUENCES AND METHODS OF OPERATING THE SAME

(71) Applicant: SILICON MOTION INC., Zhubei (TW)

(72) Inventors: Che Jen Su, Zhubei (TW); Bao Ren Guo, Zhubei (TW)

(73) Assignee: SILICON MOTION INC., Hsinchu County (TW)

( * ) Notice: Subject to any disclaimer, the term of this patent is extended or adjusted under 35 U.S.C. 154(b) by 232 days.

This patent is subject to a terminal disclaimer.

(21) Appl. No.: 17/534,283

(22) Filed: Nov. 23, 2021

(65) Prior Publication Data

US 2023/0161502 A1 May 25, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0604; G06F 3/0659; G06F 3/0679; G06F 9/3802; G06F 9/3814; G06F 9/3836; G06F 9/3838; G06F 9/3856
USPC ........................................................ 711/154
See application file for complete search history.

(56) References Cited

U.S. PATENT DOCUMENTS

| | | | | |
|---|---|---|---|---|
| 3,979,719 A | * | 9/1976 | Tooley | H04L 1/16 714/748 |
| 4,698,805 A | * | 10/1987 | Sasuta | H04W 84/08 370/327 |
| 6,389,016 B1 | * | 5/2002 | Sabaa | H04L 1/1635 370/231 |

(Continued)

FOREIGN PATENT DOCUMENTS

WO 2017131724 A1 8/2017

*Primary Examiner* — Reginald G Bragdon
*Assistant Examiner* — Aaron D Ho
(74) *Attorney, Agent, or Firm* — Duane Morris LLP

(57) ABSTRACT

The present invention provides a storage device including a controller and methods for operating the storage device and the controller. A controller of a storage device may comprise: an interface controller; a memory controller; a processor configured to transmit downstream commands and upstream commands to the memory controller. The memory controller may be coupled between the interface controller and the processor and may comprise: a first command queue; a second command queue; and a racing handler. The memory controller may be configured to: store a first command received from the processor in the first command queue; transmit, to the interface controller, first information associated with the first command; store a second command received from the processor in the second command queue; transmit, to the interface controller, second information associated with the second command; and in response to a second access region of the second command overlapping a first access region of the first command, assign a second serial number for the second command based on a first serial number for the first command by the racing handler.

18 Claims, 16 Drawing Sheets

(56) References Cited

U.S. PATENT DOCUMENTS

| | | | |
|---|---|---|---|
| 9,170,938 B1* | 10/2015 | Walsh | G06F 3/0619 |
| 9,558,232 B1* | 1/2017 | Taylor | G06F 3/0659 |
| 9,985,904 B2* | 5/2018 | Shalev | H04L 49/90 |
| 11,620,233 B1* | 4/2023 | Habusha | G06F 12/0891 |
| | | | 711/207 |
| 2004/0068614 A1* | 4/2004 | Rosenbluth | G06F 13/1642 |
| | | | 711/133 |
| 2009/0013135 A1* | 1/2009 | Burger | G06F 9/3826 |
| | | | 711/E12.001 |
| 2009/0228663 A1 | 9/2009 | Ichino | |
| 2012/0159016 A1* | 6/2012 | Morita | G06F 13/1673 |
| | | | 710/33 |
| 2014/0281042 A1 | 9/2014 | Hodges et al. | |
| 2015/0074322 A1* | 3/2015 | Galles | G06F 13/4022 |
| | | | 710/313 |
| 2017/0139600 A1* | 5/2017 | Ke | G06F 3/0619 |
| 2018/0373549 A1* | 12/2018 | Hansing | G06F 13/1684 |
| 2020/0057582 A1* | 2/2020 | Shin | G06F 3/0656 |
| 2020/0153562 A1* | 5/2020 | Liu | H04L 43/0835 |
| 2022/0066696 A1* | 3/2022 | Kang | G06F 3/0659 |
| 2022/0317934 A1* | 10/2022 | Shen | G06F 13/161 |
| 2022/0385588 A1* | 12/2022 | St-Denis | H04L 47/34 |

* cited by examiner

Upstream DMA Information Array 510

| HMB Address 511 (byte) | HMB Size 512 (bytes) | Serial Number 513 | |
|---|---|---|---|
| 0xC000 | 0x300 | 0x0001 | ← 532 |
| 0xB000 | 0x300 | 0x0002 | ← 533 |
| 0xB000 | 0x300 | 0x0003 | ← 534 |
| 0xD000 | 0x300 | 0x0004 | ← 536 |
| 0xE000 | 0x300 | 0x0005 | ← 537 |

Downstream Check Information Array 520

| HMB Address 521 (byte) | HMB Size 522 (bytes) | Serial Number 523 | |
|---|---|---|---|
| 0xB800 | 0x800 | 0x0001 | ← 535 |

Fireware Queue 310

| 319 | 318 | 317 | 316 | 315 | 314 | 313 | 312 |
|---|---|---|---|---|---|---|---|
| Up | Dn | Up | Up | Dn | Up | Up | Up |

FIG. 5C

Upstream DMA Information Array 510

| HMB Address 511 (byte) | HMB Size 512 (bytes) | Serial Number 513 |
|---|---|---|
| 0xC000 | 0x300 | 0x0001 — 532 |
| 0xB000 | 0x300 | 0x0002 — 533 |
| 0xB000 | 0x300 | 0x0003 — 534 |
| 0xD000 | 0x300 | 0x0004 — 536 |
| 0xE000 | 0x300 | 0x0005 — 537 |
| 0xF000 | 0x300 | 0x0006 — 539 |

Downstream Check Information Array 520

| HMB Address 521 (byte) | HMB Size 522 (bytes) | Serial Number 523 |
|---|---|---|
| 0xB800 | 0x800 | 0x0001 — 535 |
| 0x9800 | 0x800 | 0x0000 — 538 |

Fireware Queue 310

| 319 | 318 | 317 | 316 | 315 | 314 | 313 | 312 |
|---|---|---|---|---|---|---|---|
| Up | Dn | Up | Up | Dn | Up | Up | Up |

FIG. 5E

STORAGE DEVICES INCLUDING A CONTROLLER FOR HANDLING COMMAND SEQUENCES AND METHODS OF OPERATING THE SAME

BACKGROUND OF THE INVENTION

1. Field of the Invention

The present disclosure relates to data storage devices, and more particularly, to a data storage device using a host memory and a method of operating same.

2. Description of the Prior Art

A host may use a data storage device including nonvolatile memory, such as flash memory. The host may share a portion of its main memory (e.g., dynamic random access memory (DRAM)) with the data storage device. The host may allocate a portion of its main memory for the data storage device to be used as a data buffer. The data buffer allocated from the host's memory is called a Host Memory Buffer.

SUMMARY OF THE INVENTION

Data blocks or data commands are transmitted or performed in different command queues between the data storage device and the host. Some queues are half-duplex, and some queues are full duplex. Data blocks or data commands transmitted or performed in the half-duplex and full-duplex queues may cause data blocks or data commands to be transmitted or performed in a disorderly manner. Furthermore, even if the data blocks and the data commands are performed in full duplex, the speed of processing upstream data blocks and data commands may be different from that of processing downstream data blocks and data commands, and the differences between speeds may cause the data blocks and the data commands lose the dependency. Hence, the present disclosure provides novel data storage devices and novel methods of operating the same.

An embodiment of the present disclosure provides a controller of a storage device. The controller may comprise: an interface controller; a memory controller; a processor configured to transmit downstream commands and upstream commands to the memory controller. The memory controller may be coupled between the interface controller and the processor and may comprise: a first command queue; a second command queue; and a racing handler. The memory controller may be configured to: store a first command received from the processor in the first command queue; transmit, to the interface controller, first information associated with the first command; store a second command received from the processor in the second command queue; transmit, to the interface controller, second information associated with the second command; and in response to a second access region of the second command overlapping a first access region of the first command, assign a second serial number to the second command based on a first serial number of the first command by the racing handler. The first command may be associated with the first serial number. The first serial number may indicate order of the first information associated with the first command to be transmitted to the interface controller. The second command is received from the processor after the first command.

Another embodiment of the present disclosure provides a storage device including a controller. The controller may comprise: an interface controller; a memory controller; a processor configured to transmit downstream commands and upstream commands to the memory controller. The memory controller may be coupled between the interface controller and the processor and may comprise: a first command queue; a second command queue; and a racing handler. The memory controller may be configured to: store a first command received from the processor in the first command queue; transmit, to the interface controller, first information associated with the first command; store a second command received from the processor in the second command queue; transmit, to the interface controller, second information associated with the second command; and in response to a second access region of the second command overlapping a first access region of the first command, assign a second serial number to the second command based on a first serial number of the first command by the racing handler. The first command may be associated with the first serial number. The first serial number may indicate order of the first information associated with the first command to be transmitted to the interface controller. The second command is received from the processor after the first command.

Another embodiment of the present disclosure provides a method for operating a storage device. The method may comprise: transmitting first information associated with a first upstream command; after transmitting the first information, transmitting second information associated with a first downstream command; receiving a data block associated with the first downstream command, the data block comprising a third serial number; and re-transmitting the second information associated with the first downstream command in response to the third serial number of the data block does not corresponding to a second serial number of the first downstream command. The first upstream command may be associated with a first serial number. The first serial number may indicate order of the first information to be transmitted. The first downstream command may be associated with the second serial number. The second serial number may correspond to the first serial number.

BRIEF DESCRIPTION OF THE DRAWINGS

FIGS. 5A-5E are schematic diagrams illustrating queues and information arrays of a computer system in accordance with some embodiments of the present disclosure.

DETAILED DESCRIPTION

Embodiments of the present disclosure will be described in some additional detail with reference to the accompanying drawings. The present disclosure may, however, be embodied in many different forms and should not be construed as being limited to only the illustrated embodiments. Rather, these embodiments are provided so that this disclosure will be thorough and complete and will fully convey the scope of the inventive concept to those skilled in the art. Throughout the written description and drawings, like reference numbers and labels are used to denote like or similar elements, features, and/or method steps.

Figure 1:
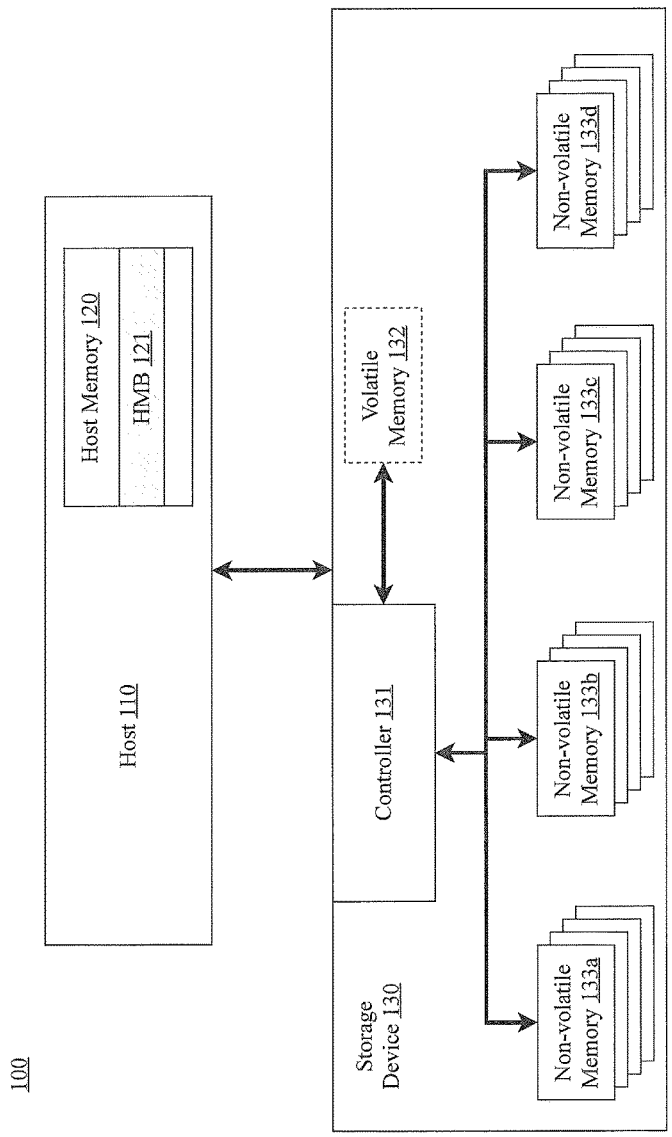
FIG. 1 is a block diagram illustrating a computer system including a data storage device in accordance with some embodiments of the present disclosure.

FIG. 1 is a block diagram illustrating a computer system including a data storage device in accordance with some embodiments of the present disclosure. Referring to FIG. 1, a computer system 100 may include a host 110, a host memory 120, and a data storage device 130.

The host 110 may drive constituent elements using, for example, an operating system (OS) included in the computer system 100. The host 110 may include controllers that control constituent elements included in the computer system 100, such as various interface(s), display(s), and related computational engine(s). The host 110 may take many different forms, such as a central processing unit (CPU), a graphic processing unit (GPU), a system on chip (SoC), and an application processor (AP).

The host memory 120 may perform various data input/output (I/O) operation(s) under the control of the host 110. The host memory 120 may operate as a main memory, an operational memory, a buffer memory, and/or a cache memory. The host memory 120 may include volatile memory, such as a DRAM, a SRAM, etc. Referring to FIG. 1, the host memory 120 may include a host memory buffer (HBM) 121.

The data storage device 130 may perform various data I/O operation(s) in response to the host 110. Referring to FIG. 1, the data storage device 130 may include a controller 131 and a plurality of non-volatile memories 133a to 133d. The data storage device 130 may include a volatile memory 132. However, in some embodiments, the data storage device 130 need not include a volatile memory 132.

The non-volatile memories 133a to 133d may be at least one of various types of memory, such as NAND flash memory, NOR flash memory, ferroelectric RAM (FRAM), phase-change RAM (PRAM), thyristor RAM (TRAM), magnetic RAM (MRAM), etc. One or more types of non-volatile memories 133a to 133d may be provided by the data storage device 130 in accordance with the design. In some embodiments, the non-volatile memories 133a to 133d may be NAND flash memories.

The controller 131 may be used to control the execution of data I/O operations with respect to the non-volatile memories 133a to 133d in response to host 110. The controller 131 may be used to convert logical address(es) received from the host 110 into corresponding physical address(es) with reference to a mapping table. Thereafter, the controller 131 may store data in the non-volatile memories 133a to 133d or read data from the non-volatile memories 133a to 133d with reference to the physical address(es).

An interface between the data storage device 130 and the host 110 may be configured to implement one or more data communication protocol(s) or specification(s). For example, the interface between the data storage device 130 and the host 110 may support communication using at least one of the standards associated with the Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), PCI express (PCIe), Nonvolatile Memory Express (NVMe), Universal Flash Storage (UFS), Secure Digital (SD), Multi-Media Card (MMC), embedded MMC (eMMC), etc.

As previously noted, the data storage device 130 may not include the volatile memory 132. Instead, the data storage device 130 may use a portion of the host memory 120 connected to the host 110. The host 110 may allocate a portion of the host memory 120 to serve, for example, as a host memory buffer 121. The term "host memory buffer" 121 may denote some designated part (or collection of parts) of the host memory 120, as operationally allocated by the host 110 on behalf of the data storage device 130. The HMB 121 may serve as a data buffer between the host 110 and the data storage device 130. The HMB 121 may be helpful to expedite the data access between the host 110 and the data storage device 130.

The host 110 may arbitrarily access (first access) target data stored in the data storage device 130. Subsequently, the host 110 may again (or repeatedly) access (second or subsequent access) the target data (i.e., the most recently accessed data). Alternatively, the host 110 may access data that is adjacent to the target data (adjacent data) during a second or subsequent access. These types of data access may be understood as having a regional characteristic (i.e., "data locality"). That is, subsequently accessed data will be proximate to or identical (wholly or in part) to data recently or most recently accessed. Recognizing this regional characteristic in certain types of data, and corresponding data access, the HMB 121 may be helpful to expedite the data access between the host 110 and the data storage device 130.

Figure 2:
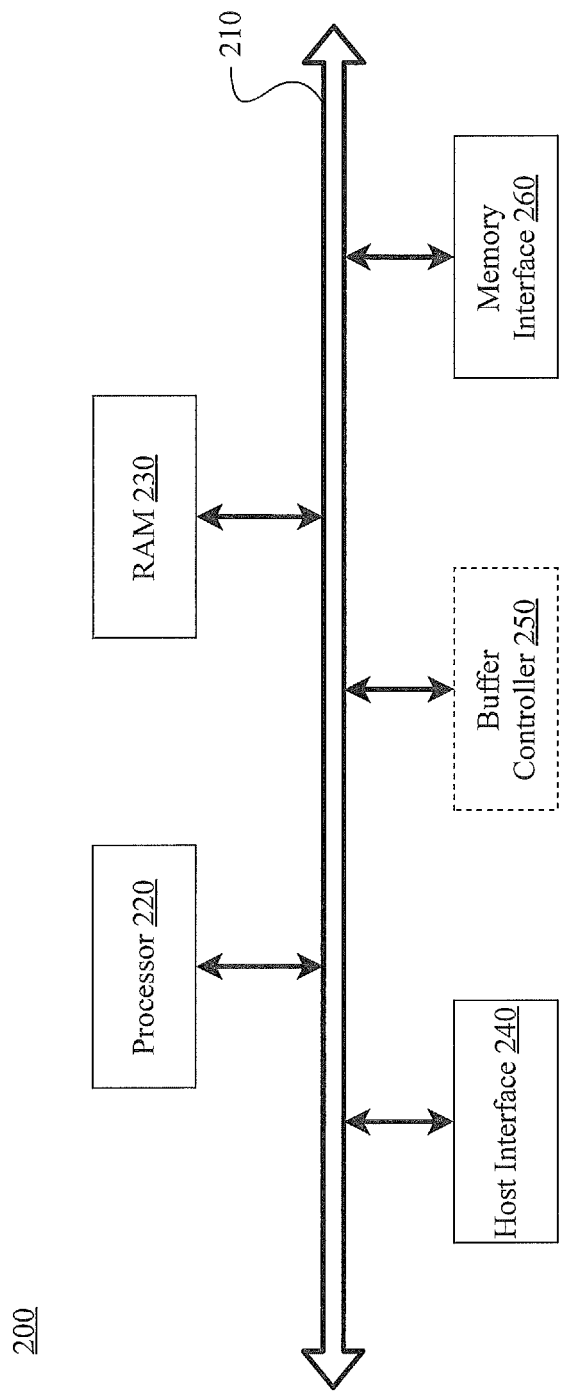
FIG. 2 is a block diagram illustrating a controller in accordance with some embodiments of the present disclosure.

FIG. 2 is a block diagram further illustrating a controller 200 in accordance with some embodiments of the present disclosure. The controller may be a possible example of the controller 131 shown in FIG. 1. Referring to FIG. 2, the controller 200 may include a bus 210, a processor 220, a RAM 230, a host interface 240, a buffer controller 250, and a memory interface 260. In some embodiments, the controller 200 may not include a buffer controller 250.

The bus 210 is configured to provide a channel between constituent elements of the memory controller 200. The processor 220 may control an overall operation of the memory controller 200 and perform logical operations. The processor 220 may communicate with an external host (e.g., the host 110 shown in FIG. 1) through the host interface 240. The processor 220 may store a command or an address received from the host interface 240 in the RAM 230.

The RAM 230 may be used as an operation memory, a cache memory, or a buffer memory of the processor 220. The RAM 230 may store codes and commands executed by the processor 220. The RAM 230 may store data processed by the processor 220. The RAM 230 may include a SRAM.

The host interface 240 is configured to communicate with the host 110 under the control of the processor 220. The host interface 240 may be configured to perform a communication using at least one of the various protocols described above in relation to FIG. 1.

In certain embodiments, the buffer controller 250 may be included to control a buffer (e.g., DRAM) built in the data storage device. However, since a buffer is not included in the data storage device 130 and the controller 200 performs data I/O operation(s) (the loading of a mapping table, etc., using the host memory buffer 121), the buffer controller 250 need not be included in the controller 200. Thus, the overall size and cost of the data storage device 130 may be decreased.

Referring still to FIGS. 1 and 2, the use of the volatile memory 132, when present, may be controlled by the processor 220. In the computer system 100, including a data storage device 130 in accordance with some embodiments of the present disclosure, the data storage device 130 need not include the volatile memory 132. Thus, the data storage device 130 may not include the buffer controller 250.

The memory interface 260 may communicate with the non-volatile memories 133a to 133d (refer to FIG. 1) under the control of the processor 220.

Figure 3A:
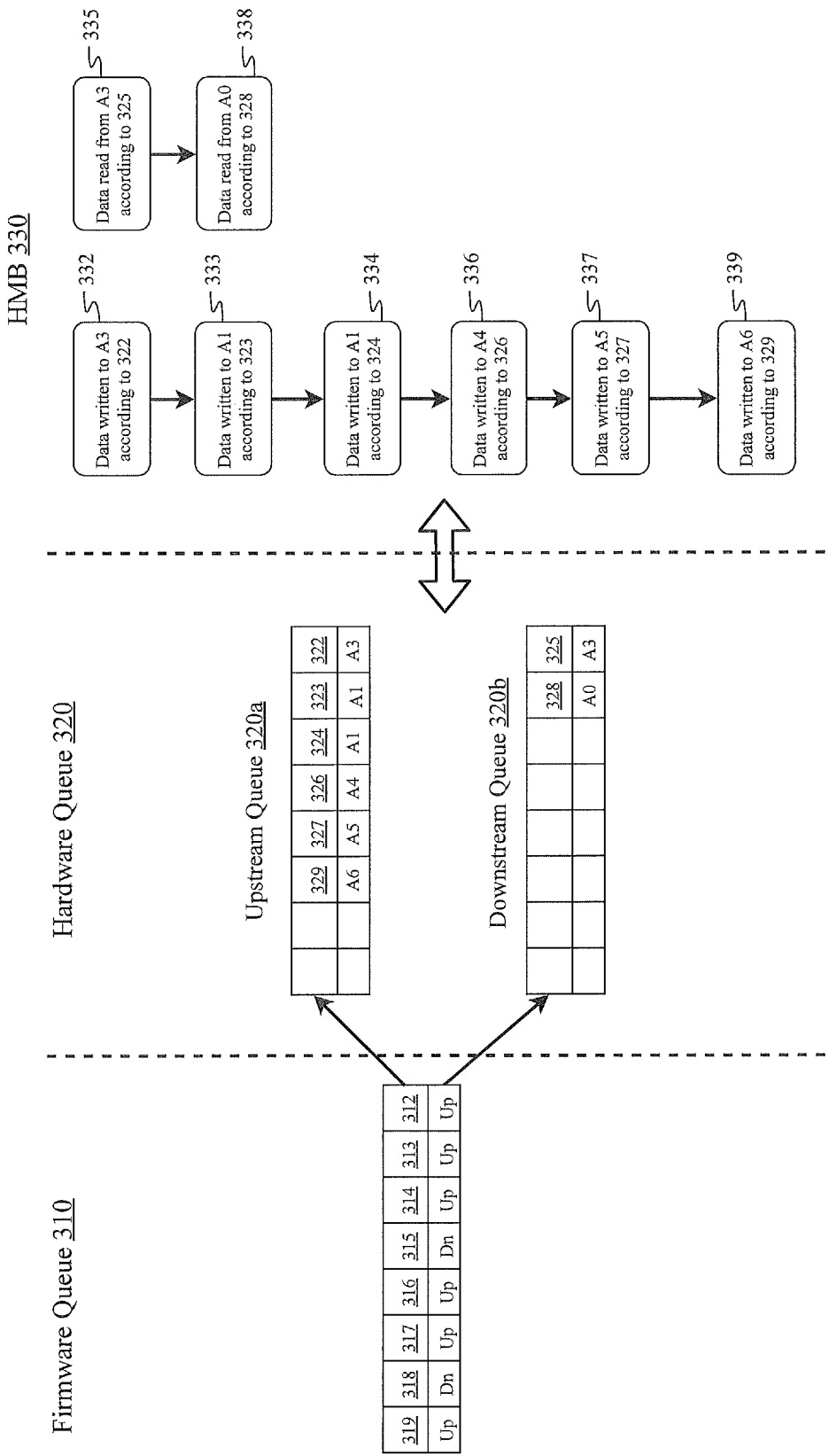
FIGS. 3A and 4A are schematic diagrams illustrating queues and operations for a computer system in accordance with some embodiments of the present disclosure.

FIG. 3A is a schematic diagram illustrating queues and operations for the computer system 100 in accordance with some embodiments of the present disclosure. FIG. 3A may illustrate queues for a data storage device 130 and operations for the host 110.

FIG. 3A discloses a firmware queue 310 and a hardware queue 320. The firmware queue 310 may be implemented by a program at a level higher than that of the program implementing the hardware queue 320. In some embodiments, the firmware queue 310 may be implemented through a firmware executed by the controller 131 shown in FIG. 1. In some embodiments, the hardware queue 320 may be implemented through the processor 220, the RAM 230, the host interface 240, and the memory interface 260 shown in FIG. 2.

FIG. 3A discloses an HMB 330. The HMB 330 may be similar the HMB 121 shown in FIG. 1. The HMB 330 may be a portion of host memory included in a host and may be implemented through a software or a firmware executed by the host.

Referring to FIG. 3A, several commands may be queued in the firmware queue 310. Each of the commands queued in the firmware queue 310 may include the associated data block, data length, action, and memory address. Commands 312 to 319 may be queued in the firmware queue 310. Command 312 may be at the front of the firmware queue 310. Command 319 may be at the rear of the firmware queue 310. Commands 312, 313, 314, 316, 317, and 319 may be upstream commands (e.g., the commands cause data transmitted from the data storage device 130 to the host 110). Commands 315 and 318 may be downstream commands (e.g., the commands cause data transmitted from the host 110 to the data storage device 130).

The commands in the firmware queue 310 may be popped and executed. The commands in the firmware queue 310 may be processed in a half-duplex way. According to the first-in-first-out principle of a queue, the commands 312-319 may be popped and executed in sequence, i.e., the command 312 is popped and executed first, and the command 313 is popped and executed.

Referring to FIG. 3A, the hardware queue 320 may include an upstream queue 320a and a downstream queue 320b. Commands 322, 323, 324, 326, 327, and 329 may be queued in the upstream queue 320a. Each of the commands queued in the upstream queue 320a may include the associated data block, data length, and memory address. Commands 325 and 328 may be queued in the upstream queue 320b. Each of the commands queued in the downstream queue 320b may include the associated data block, data length, and memory address.

After a command in the firmware queue 310 is popped and executed, a corresponding command may be generated and pushed into the hardware queue 320. For example, after the command 312 in the firmware queue 310 is popped and executed, the corresponding command 322 may be generated and pushed into the upstream queue 320a. After the command 313 in the firmware queue 310 is popped and executed, the corresponding command 323 may be generated and pushed into the upstream queue 320a. After the command 314 in the firmware queue 310 is popped and executed, the corresponding command 324 may be generated and pushed into the upstream queue 320a. After the command 315 in the firmware queue 310 is popped and executed, the corresponding command 325 may be generated and pushed into the downstream queue 320b. After the command 316 in the firmware queue 310 is popped and executed, the corresponding command 326 may be generated and pushed into the upstream queue 320a. After the command 317 in the firmware queue 310 is popped and executed, the corresponding command 327 may be generated and pushed into the upstream queue 320a. After the command 318 in the firmware queue 310 is popped and executed, the corresponding command 328 may be generated and pushed into the downstream queue 320b. After the command 319 in the firmware queue 310 is popped and executed, the corresponding command 329 may be generated and pushed into the upstream queue 320a.

The commands in the hardware queue 320 may be processed in a full-duplex way. The commands in the upstream queue 320a and the commands in the downstream queue 320b may be processed in parallel. For example, the commands 321 and 325 may be popped and executed simultaneously. When a command in the hardware queue 320 is popped and executed, a host (e.g., the host 110) may be required to perform some operations for the HMB 330.

The interface between the hardware queue 320 and the HMB 330 may be an interface between the data storage device 130 and the host 110. The interface between the hardware queue 320 and the HMB 330 may support communication using at least one of the standards associated with the Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), PCI express (PCIe), Nonvolatile Memory Express (NVMe), Universal Flash Storage (UFS), Secure Digital (SD), Multi-Media Card (MMC), embedded MMC (eMMC), etc.

In the upstream queue 320a, when the command 322 is popped and executed, the data associated with the command 322 may be written to address A3 of the HMB 330 (e.g., HMB address A3). When the command 323 is popped and executed, the data associated with the command 323 may be written to address A1 of the HMB 330. When the command 324 is popped and executed, the data associated with the command 324 may be written to address A1 of the HMB 330. When the command 326 is popped and executed, the data associated with the command 326 may be written to address A4 of the HMB 330. When the command 327 is popped and executed, the data associated with the command 327 may be written to address A5 of the HMB 330. When the command 329 is popped and executed, the data associated with the command 329 may be written to address A6 of the HMB 330.

In the downstream queue 320b, when the command 325 is popped and executed, the data associated with the command 325 may be read from address A3 of the HMB 330 (e.g., HMB address A3). When the command 328 is popped and executed, the data associated with the command 328 may be read from address A0 of the HMB 330.

In the HMB 330, operations may be performed according to the commands in the hardware queue 320. In operation 332, the associated data may be written to address A3 according to 322. In operation 333, the associated data may be written to address A1 according to 323. In operation 334, the associated data may be written to address A1 according to 324. In operation 336, the associated data may be written to address A4 according to 326. In operation 337, the associated data may be written to address A5 according to 327. In operation 339, the associated data may be written to address A6 according to 321.

In operation 335, the associated data may be read from address A3 according to 325. In operation 338, the associated data may be read from address A0 according to 328. The operations 332, 333, 334, 336, 337, and 339 may be performed in parallel with the operations 335 and 338. For example, operations 332 and 335 may be performed simultaneously.

Referring to firmware queue 310, the downstream command 315 should be executed after the upstream commands 312 to 314. Taking the sequence of the commands 312 to 315 in the firmware queue 310 into consideration, the command 325 in the downstream queue 320b should be used to read the data at address A3, which is written according to the command 322. However, in the HMB 330, operations 332 and 335 may be performed simultaneously, and it may be highly possible that operation 335 may be performed before operation 332 is finished. If operation 335 is performed before operation 332 is finished, the data read from address A3 in operation 335 may not be the data written to address A3 according to command 322, and erroneous data read may be caused. This issue may be caused by the mismatch between the order of the commands in the firmware queue 310 and that of the popped commands from the hardware queue 320. This issue may be caused by the mismatch between the order of the commands in the firmware queue 310 and that of the operations performed in the HMB 330.

Figure 3B:
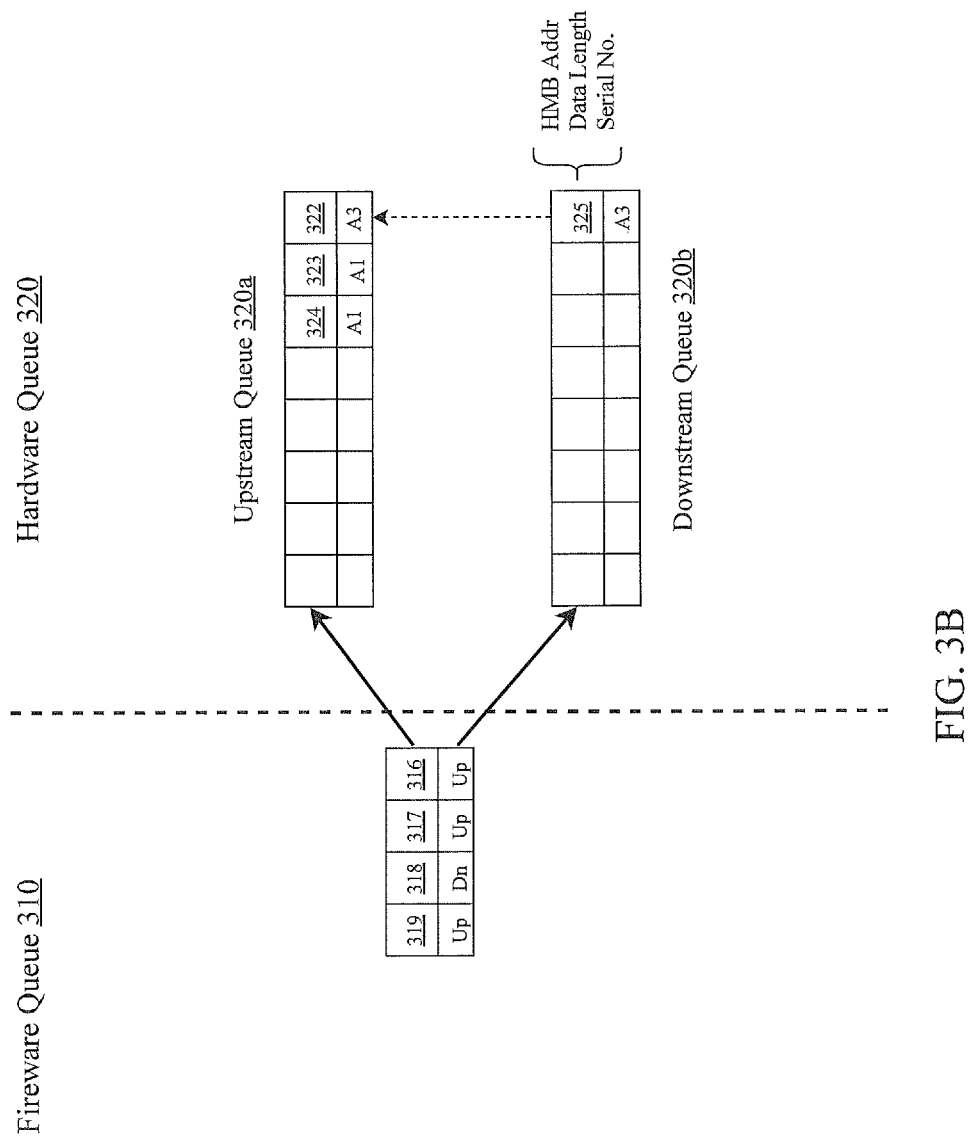
FIGS. 3B and 4B are schematic diagrams illustrating queues of a computer system in accordance with some embodiments of the present disclosure.

FIG. 3B is a schematic diagram illustrating queues of a computer system 100 in accordance with some embodiments of the present disclosure. FIG. 3B may illustrate queues for a data storage device 130.

The firmware queue 310 and hardware queue 320 in FIG. 3B may be similar to those in FIG. 3A. In firmware queue 310 of FIG. 3B, the commands 312 to 315 have been popped and executed, and the corresponding commands 322 to 325 are generated and pushed into the hardware queue 320.

After the commands 312 to 314 in the firmware queue 310 are popped and executed, the corresponding commands 322 to 324 may be generated and pushed into the upstream queue 320a. After the command 315 in the firmware queue 310 is popped and executed, the corresponding command 325 may be generated and pushed into the downstream queue 320b. When the command 325 is pushed into the downstream queue 320b, a controller (e.g., the controller 131) may perform an operation to check if the access region to be read according to the command 325 overlaps with the access region to be written according to one or more commands queued in the upstream queue 320a. In some embodiments, the access region may be determined based on the address of the HMB to be written or read (e.g., the HMB address) and the data length to be written or read (e.g., the HMB size).

For example, when command 325 is pushed into the downstream queue 320b, the controller (e.g., the controller 131) may check if the access region to be read according to the command 325 (e.g., HMB address A3) overlaps with the access region to be written according to one or more of commands 322 to 324. After checking with the commands 322 to 324, it is determined that the access region to be written according to the command 322 (e.g., HMB address A3) overlaps with the access region to be read according to the command 325. Thus, the command 325 may be popped or executed after the command 322. Popping or execution of the command 325 may be delayed until the command 322 have been popped and executed.

Figure 4A:
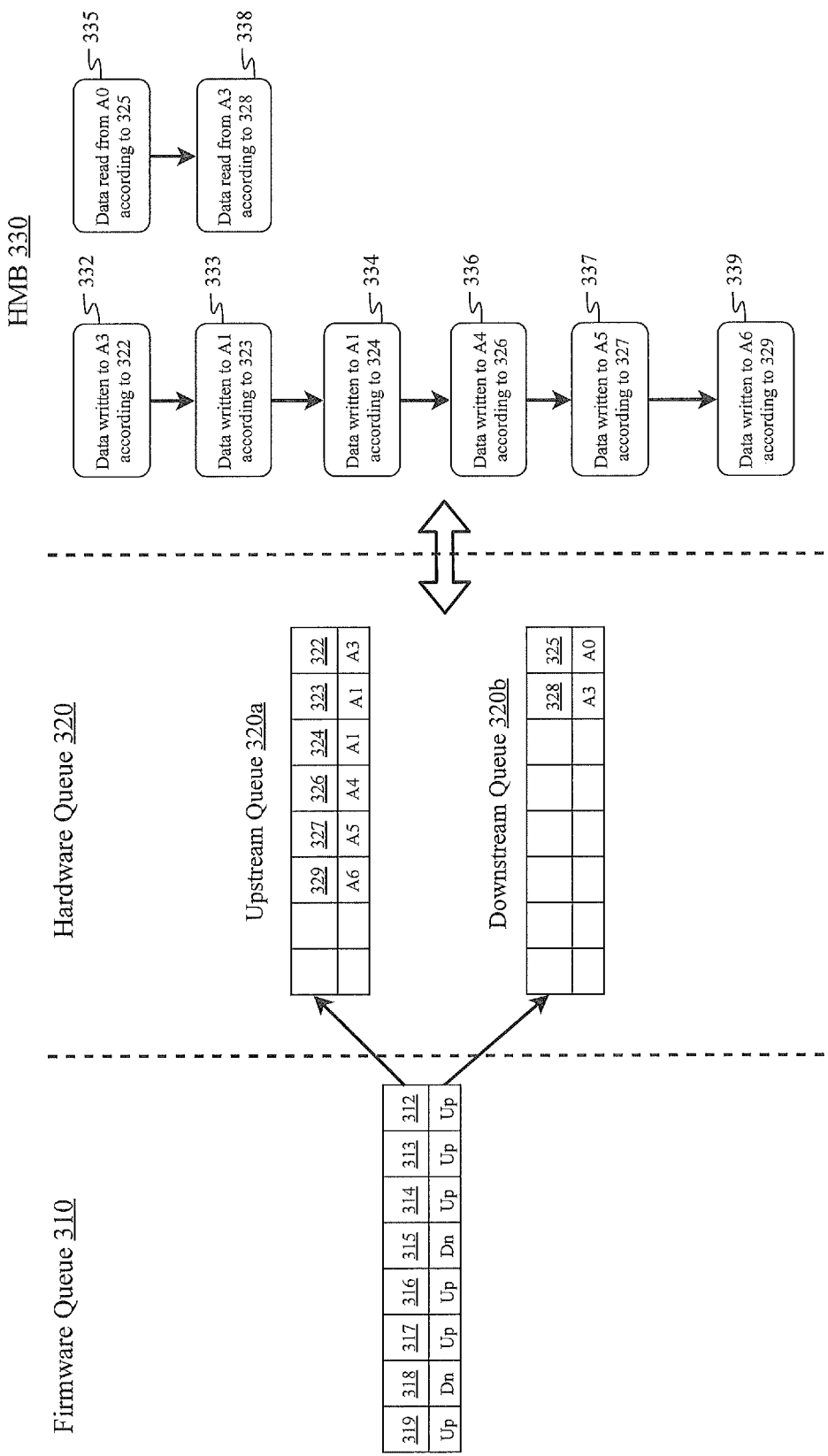

FIG. 4A is a schematic diagram illustrating queues and operations for the computer system 100 in accordance with some embodiments of the present disclosure. FIG. 4A may illustrate queues for a data storage device 130 and operations for the host 110.

FIG. 4A may be similar to FIG. 3A. Compared with FIG. 3A, in the downstream queue 320b of FIG. 4B, when the command 325 is popped and executed, the data associated with the command 325 may be read from address A0 of the HMB 330 (e.g., HMB address A0). When the command 328 is popped and executed, the data associated with the command 328 may be read from address A3 of the HMB 330.

Compared with FIG. 3A, in operation 335 of FIG. 4A, the associated data may be read from address A0 according to 325. In operation 338 of FIG. 4A, the associated data may be read from address A3 according to 328. Similar to FIG. 3A, in the HMB 330 of FIG. 4A, the operations 332, 333, 334, 336, 337, and 339 may be performed in parallel with the operations 335 and 338. For example, operations 332 and 335 in FIG. 4A may be performed simultaneously.

Referring to firmware queue 310, the downstream command 318 should be executed after the upstream commands 312 to 317. Taking the sequence of the commands 312 to 318 in the firmware queue 310 into consideration, the command 328 in the downstream queue 320b should be used to read the data at address A3, which is written according to the command 322. Although operation 338 may be performed later than operation 332, it may be possible that operation 338 may be performed before operation 332 is finished. If operation 338 is performed before operation 332 is finished, the data read from address A3 in operation 338 may not be the data written to address A3 according to command 322, and erroneous data read may be caused. This issue may be caused by the mismatch between the order of the commands in the firmware queue 310 and that of the popped commands from the hardware queue 320. This issue may be caused by the mismatch between the order of the commands in the firmware queue 310 and that of the operations performed in the HMB 330.

Figure 4B:
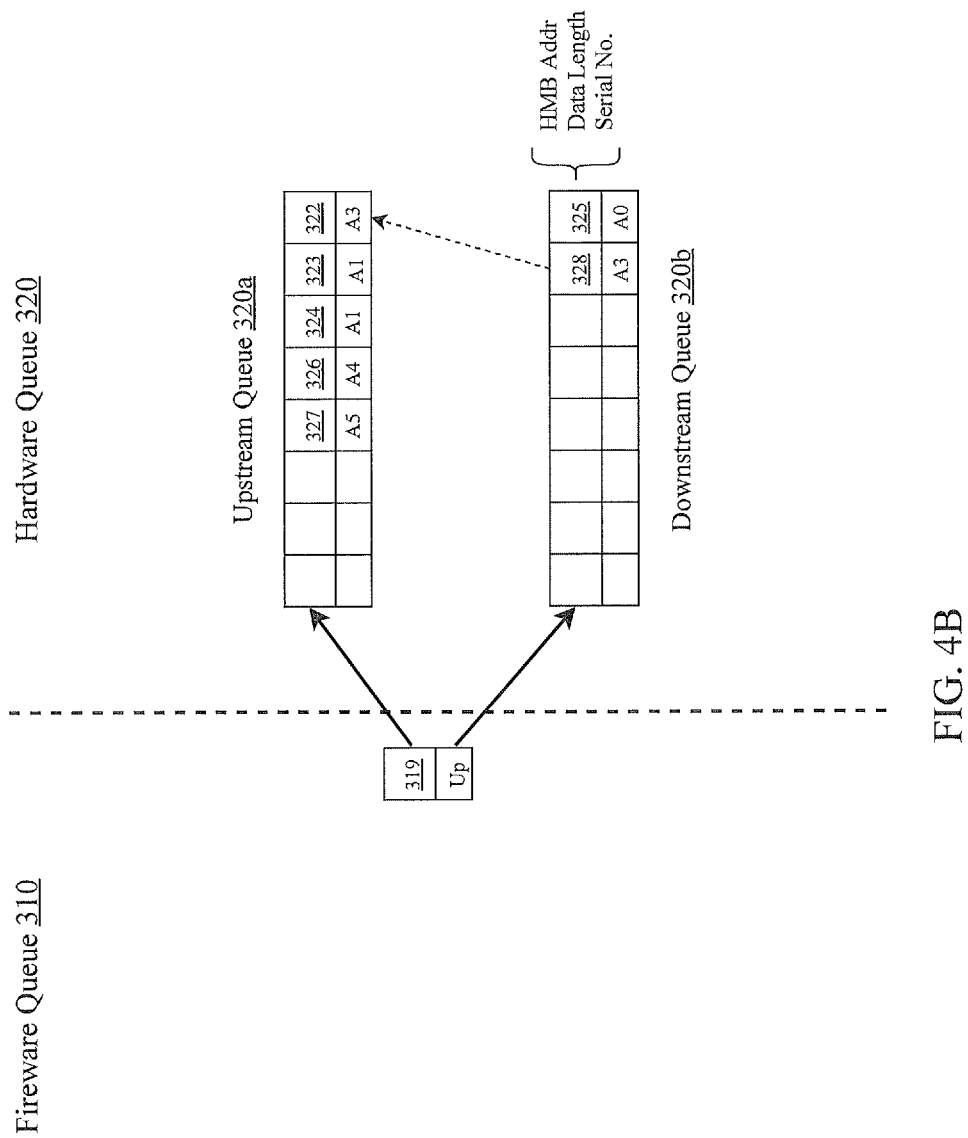

FIG. 4B is a schematic diagram illustrating queues of a computer system 100 in accordance with some embodiments of the present disclosure. FIG. 4B may illustrate queues for a data storage device 130.

The firmware queue 310 and hardware queue 320 in FIG. 4B may be similar to those in FIG. 4A. In firmware queue 310 of FIG. 4B, the commands 312 to 318 have been popped and executed, and the corresponding commands 322 to 328 are generated and pushed into the hardware queue 320.

After the commands 312 to 314 in the firmware queue 310 are popped and executed, the corresponding commands 322 to 324 may be generated and pushed into the upstream queue 320a. After the command 315 in the firmware queue 310 is popped and executed, the corresponding command 325 may be generated and pushed into the downstream queue 320b. After the commands 316 and 317 in the firmware queue 310 is popped and executed, the corresponding commands 326 and 327 may be generated and pushed into the upstream queue 320a. After the command 318 in the firmware queue 310 is popped and executed, the corresponding command 328 may be generated and pushed into the downstream queue 320b.

When the command 328 is pushed into the downstream queue 320b, a controller (e.g., the controller 131) may perform an operation to check if the access region to be read according to the command 328 overlaps with the access region to be written according to one or more commands queued in the upstream queue 320a. In some embodiments, the access region may be determined based on the address of the HMB to be written or read (e.g., the HMB address) and the data length to be written or read (e.g., the HMB size).

For example, when command 328 is pushed into the downstream queue 320b, the controller (e.g., the controller 131) may check if the access region to be read according to the command 328 (e.g., HMB address A3) overlaps with the access region to be written according to one or more of commands 322 to 324, 326 and 327. After checking with the commands 322 to 324, 326 and 327, it is determined that the access region to be written according to the command 322 (e.g., HMB address A3) overlaps with the access region to be read according to the command 328. Thus, the command 328 may be popped or executed after the command 322. Popping or execution of the command 328 may be delayed until the command 322 have been popped and executed.

FIGS. 5A-5E are schematic diagrams illustrating queues and information arrays of a computer system in accordance with some embodiments of the present disclosure. In FIGS. 5A-5E, the firmware queue 310 may be identical to that shown in FIG. 3A.

FIGS. 5A-5E disclose an upstream direct memory access (DMA) information array 510 and a downstream check information array 520. The upstream DMA information array 510 and the downstream check information array 520 may include the information associated with the executions of the commands in firmware queue 310. The upstream DMA information array 510 and the downstream check information array 520 may include the information associated with the commands in the hardware queue 320. The upstream DMA information array 510 may include the information associated with the commands in the upstream queue 320a. The upstream DMA information array 510 may include the information associated with the commands of which the corresponding DMA processes are finished (e.g., the commands have been transmitted to the upstream DMA 725, or the corresponding writing of the commands have been finished). The downstream check information array 520 may include the information associated with the commands in the downstream queue 320b.

The upstream DMA information array 510 may include several characteristics, e.g., HMB address 511 (byte), HMB size 512 (bytes), and serial number 513 (of the commands queued in the upstream queue 320a). The downstream check information array 520 may include several characteristics, e.g., HMB address 521 (byte), HMB size 522 (bytes), and serial number 523 (of the commands queued in the downstream queue 320b). As shown in FIGS. 5A-5E, the HMB address 511, the HMB size 512, the serial number 513, the HMB address 521, the HMB size 522, and the serial number 523 may be recorded in hexadecimal values.

After the commands 312 to 314 in the firmware queue 310 are popped and executed, the information of the corresponding commands (e.g., commands 322 to 324) may be recorded in the upstream DMA information array 510.

In some embodiments, after the corresponding DMA processes of commands 312 to 314 in the firmware queue 310 are finished, the information associated with commands 312 to 314 may be recorded in the upstream DMA information array 510. For example, after commands 312 to 314 have been transmitted to the upstream DMA 725, the information associated with commands 312 to 314 may be recorded in the upstream DMA information array 510. In some other examples, after the corresponding writings of commands 312 to 314 have been finished, the information associated with commands 312 to 314 may be recorded in the upstream DMA information array 510.

The entry 532 may correspond to the execution of the command 312 in firmware queue 310. The entry 533 may correspond to the execution of the command 313 in firmware queue 310. The entry 534 may correspond to the execution of the command 314 in firmware queue 310. In some embodiments, the entries 532 to 534, respectively, may correspond to the commands 322 to 324 in upstream queue 320a.

The HMB address 511 and HMB size 512 may be used to determine an access region of the HMB to be written according to the corresponding command. For example, with respect to the entry 532, the HMB address 511 is 0xC000 and the HMB size 512 is 0x300; these two characteristics may be used to determine a access region to be written according to the corresponding command (e.g., command 322). The serial numbers 513 with respect to the entries 532 to 534 may be numbered in sequence. For example, the serial numbers of entries 532 to 534 are 0x0001, 0x0002, and 0x0003, respectively.

Figure 5A:
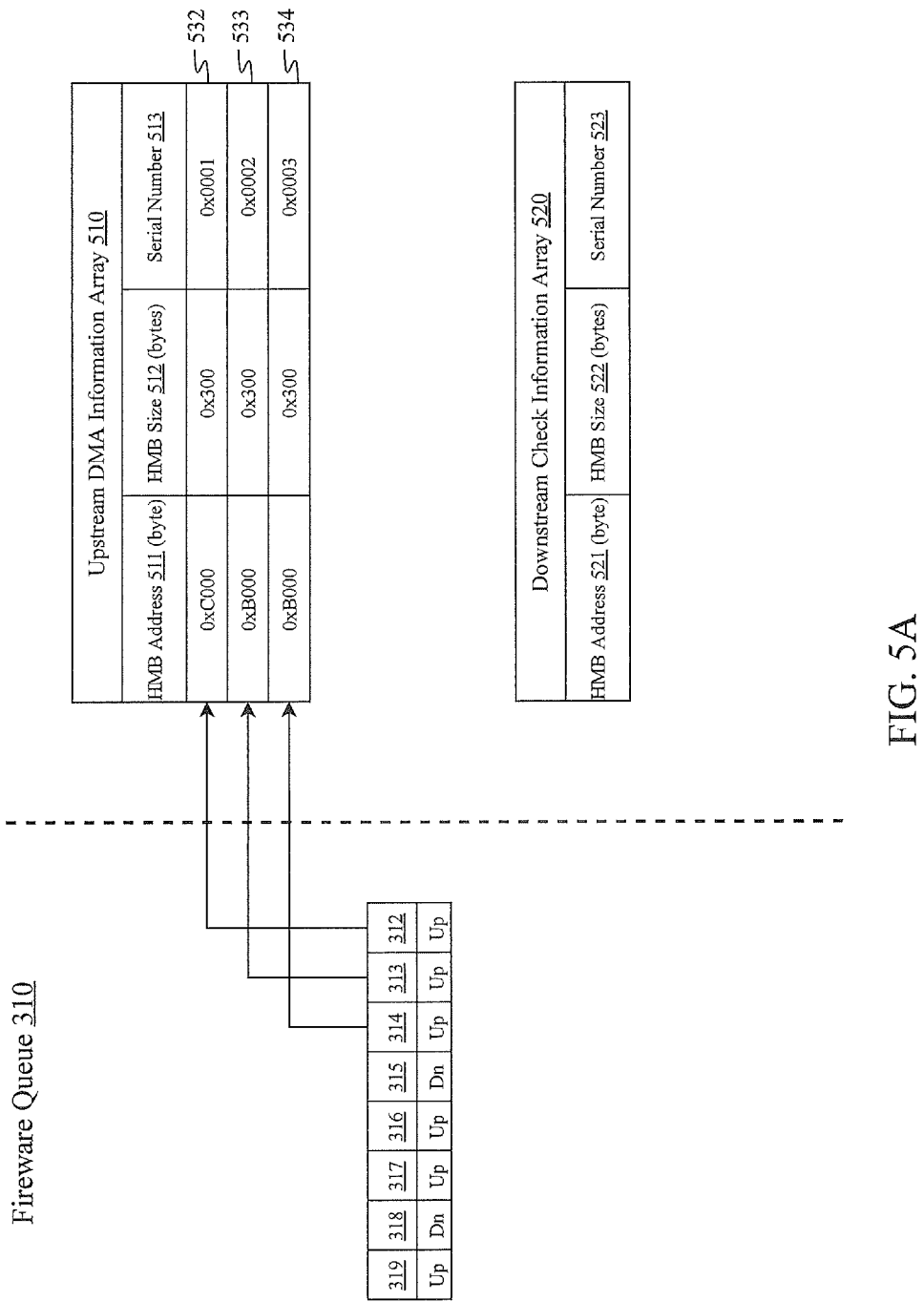
Figure 5B:
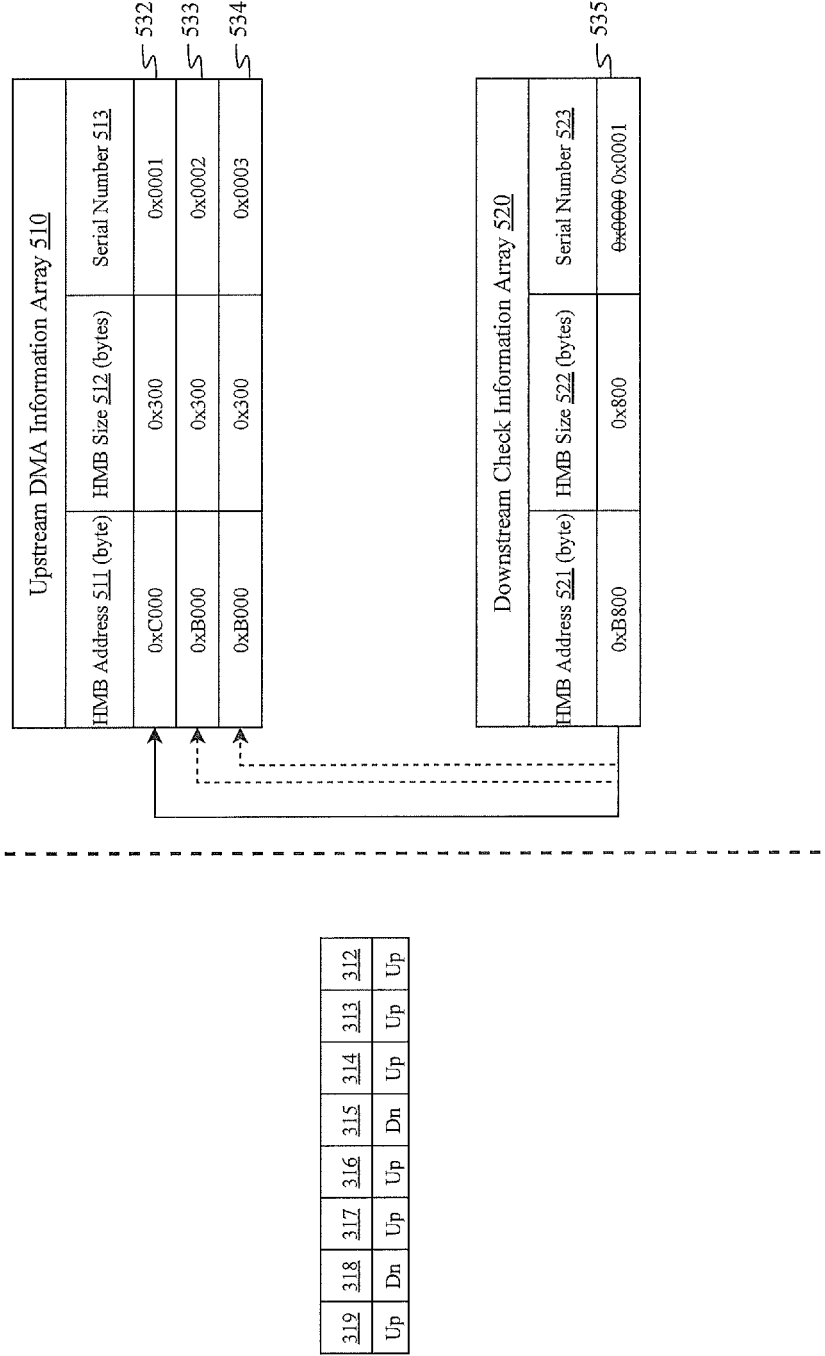

Referring to FIG. 5B, entry 535 is added relative to the FIG. 5A. After the command 315 in the firmware queue 310 is popped and executed, the information of the corresponding commands (e.g., command 325) may be recorded in the downstream check information array 520. The entry 535 may correspond to the execution of the command 315 in firmware queue 310. In some embodiments, the entry 535 may correspond to the command 325 in downstream queue 320b.

The HMB address 521 and HMB size 522 may be used to determine an access region of the HMB to be read according to the corresponding command. For example, with respect to the entry 535, the HMB address 521 is 0xB800 and the HMB size 522 is 0x800; these two characteristics may be used to determine a access region to be read according to the corresponding command (e.g., command 325). The serial number 523 with respect to the entries in the downstream check information array 520 may not be initially numbered in sequence. For example, the serial numbers of entry 535 may be initially set to a default value (e.g., 0x0000).

When command 325 is pushed into the downstream queue 320b, a controller (e.g., the controller 131) may check if the access region to be read according to the command 325 (e.g., HMB address A3 shown in FIG. 3A) overlaps with the access region to be written according to one or more of the commands queued in the upstream queue 320a (e.g., the commands 322 to 324). When the entry 535 is pushed into the downstream check information array 520, a controller (e.g., the controller 131) may check if the access region defined by the entry 535 (e.g., the access region to be read)

overlaps the access region defined by one or more entries in the upstream DMA information array 510 (e.g., the entries 532 to 534).

Referring to FIG. 5B, it may be checked if the access region to be read according to the entry 535 (may correspond to the command 325) overlaps with the access region to be written according to one or more of the entries 532 to 534 (may correspond to the commands 322 to 324). The access region to be read according to the entry 535 may be determined by the HMB address 0xB800 and the HMB Size 0x800; the access region to be read according to the entry 535 may be from the HMB address 0xB800 to the HMB address 0xC000.

The access region to be written according to the entry 532 may be determined by the HMB address 0xC000 and the HMB Size 0x300; the access region to be written according to the entry 532 may be from the HMB address 0xC000 to the HMB address 0xC300.

Therefore, it may be determined that the access region to be read according to the entry 535 overlaps with the access region to be written according to the entry 532. Then, the serial number in entry 535 may be changed from 0x0000 (e.g., the default value) to the serial number of the entry 532 (e.g., 0x0001).

Referring to FIG. 5B, the access region to be written according to the entry 533 may be determined by the HMB address 0xB000 and the HMB Size 0x300; the access region to be written according to the entry 533 may be from the HMB address 0xB000 to the HMB address 0xB300. The access region to be written according to the entry 534 may be determined by the HMB address 0xB000 and the HMB Size 0x300; the access region to be written according to the entry 534 may be from the HMB address 0xB000 to the HMB address 0xB300.

Therefore, it may be determined that the access region to be read according to the entry 535 does not overlap with the access region to be written according to the entry 533 or 534. Then, the serial number in entry 535 may be not changed (e.g., 0x0001).

Referring to FIG. 5C, entries 536 and 537 are added compared with the FIG. 5B. After the commands 316 and 317 in the firmware queue 310 are popped and executed in sequence, the information of the corresponding commands (e.g., commands 326 and 327) may be recorded in the upstream DMA information array 510 in sequence. The entries 536 and 537 may correspond to the execution of the commands 316 and 317 in firmware queue 310, respectively. In some embodiments, the entries 536 and 537 may correspond to the commands 326 and 327 in upstream queue 320a, respectively.

With respect to the entry 536, the HMB address 511 is 0xD000 and the HMB size 522 is 0x300; these two characteristics may be used to determine a access region to be written according to the corresponding command (e.g., command 326). With respect to the entry 537, the HMB address 511 is 0xE000 and the HMB size 522 is 0x300; these two characteristics may be used to determine a access region to be written according to the corresponding command (e.g., command 327). The serial number 513 with respect to the entries in the upstream DMA information array 510 may be numbered in sequence. That is, the serial numbers of the entries 536 and 537 are 0x0004 and 0x0005, respectively.

Figure 5D:
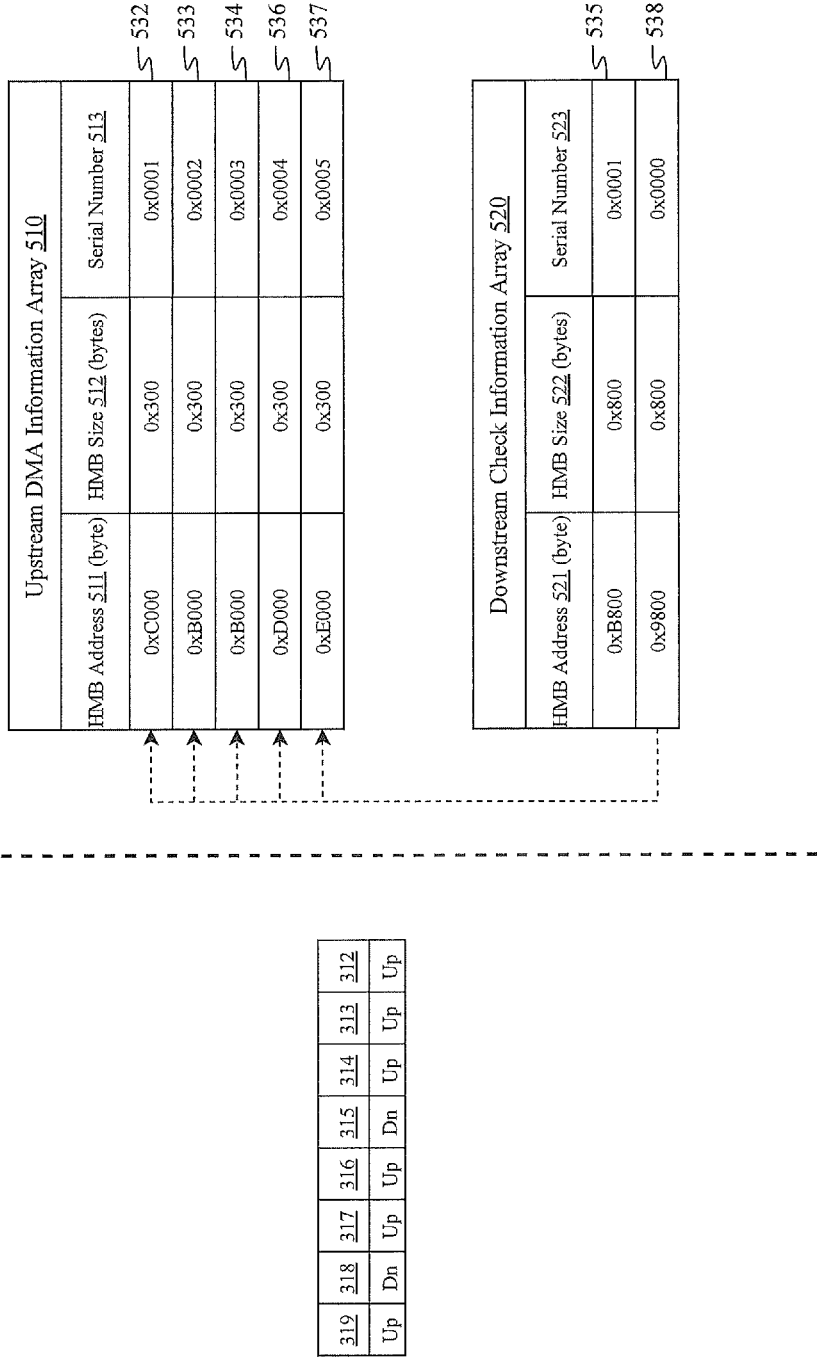

Referring to FIG. 5D, entry 538 is added compared with the FIG. 5C. After the command 318 in the firmware queue 310 is popped and executed, the information of the corresponding commands (e.g., command 328) may be recorded in the downstream check information array 520. The entry 538 may correspond to the execution of the command 318 in firmware queue 310. In some embodiments, the entry 538 may correspond to the command 328 in downstream queue 320b.

With respect to the entry 538, the HMB address 521 is 0x9800 and the HMB size 522 is 0x800; these two characteristics may be used to determine a access region to be read according to the corresponding command (e.g., command 328). The serial number 523 with respect to the entries in the downstream check information array 520 may not be initially numbered in sequence. For example, the serial numbers of entry 535 may be initially set to a default value (e.g., 0x0000).

When command 328 is pushed into the downstream queue 320b, a controller (e.g., the controller 131) may check if the access region to be read according to the command 328 (e.g., HMB address A0 shown in FIG. 3A) overlaps with the access region to be written according to one or more of the commands queued in the upstream queue 320a (e.g., the commands 322 to 324, 326 and 327). When the entry 538 is pushed into the downstream check information array 520, a controller (e.g., the controller 131) may check if the access region defined by the entry 538 (e.g., the access region to be read) overlaps the access region defined by one or more entries in the upstream DMA information array 510 (e.g., the entries 532 to 534, 536, and 537).

Referring to FIG. 5D, it may be checked if the access region to be read according to the entry 538 (may correspond to the command 328) overlaps with the access region to be written according to one or more of the entries 532 to 534, 536, and 537 (may correspond to the commands 322 to 324, 326 and 327). The access region to be read according to the entry 538 may be determined by the HMB address 0x9800 and the HMB Size 0x800; the access region to be read according to the entry 538 may be from the HMB address 0x9800 to the HMB address 0xA000.

The access region to be written according to the entry 532 may be from the HMB address 0xC000 to the HMB address 0xC300. The access region to be written according to the entry 533 may be from the HMB address 0xB000 to the HMB address 0xB300. The access region to be written according to the entry 534 may be from the HMB address 0xB000 to the HMB address 0xB300. The access region to be written according to the entry 536 may be from the HMB address 0xD000 to the HMB address 0xD300. The access region to be written according to the entry 537 may be from the HMB address 0xE000 to the HMB address 0xE300. Therefore, it may be determined that the memory to be read according to the entry 538 does overlaps with the access region to be written according to the entry 532 to 534, 536, and 537, and the order tag in entry 538 may be kept the default value (e.g., 0x000).

Referring to FIG. 5E, entry 539 added compared with the FIG. 5D. After the command 319 in the firmware queue 310 is popped and executed, the information of the corresponding command (e.g., command 329) may be recorded in the upstream DMA information array 510 in sequence. The entry 539 may correspond to the execution of the command 319 in firmware queue 310. In some embodiments, the entry 539 may correspond to the command 329 in downstream queue 320b.

With respect to the entry 539, the HMB address 511 is 0xF000 and the HMB size 522 is 0x300; these two characteristics may be used to determine a access region to be written according to the corresponding command (e.g., command 329). The serial number 513 with respect to the entries in the upstream DMA information array 510 may be numbered in sequence. That is, the serial number of the entry 539 is 0x06.

Figures 6A, 6B:
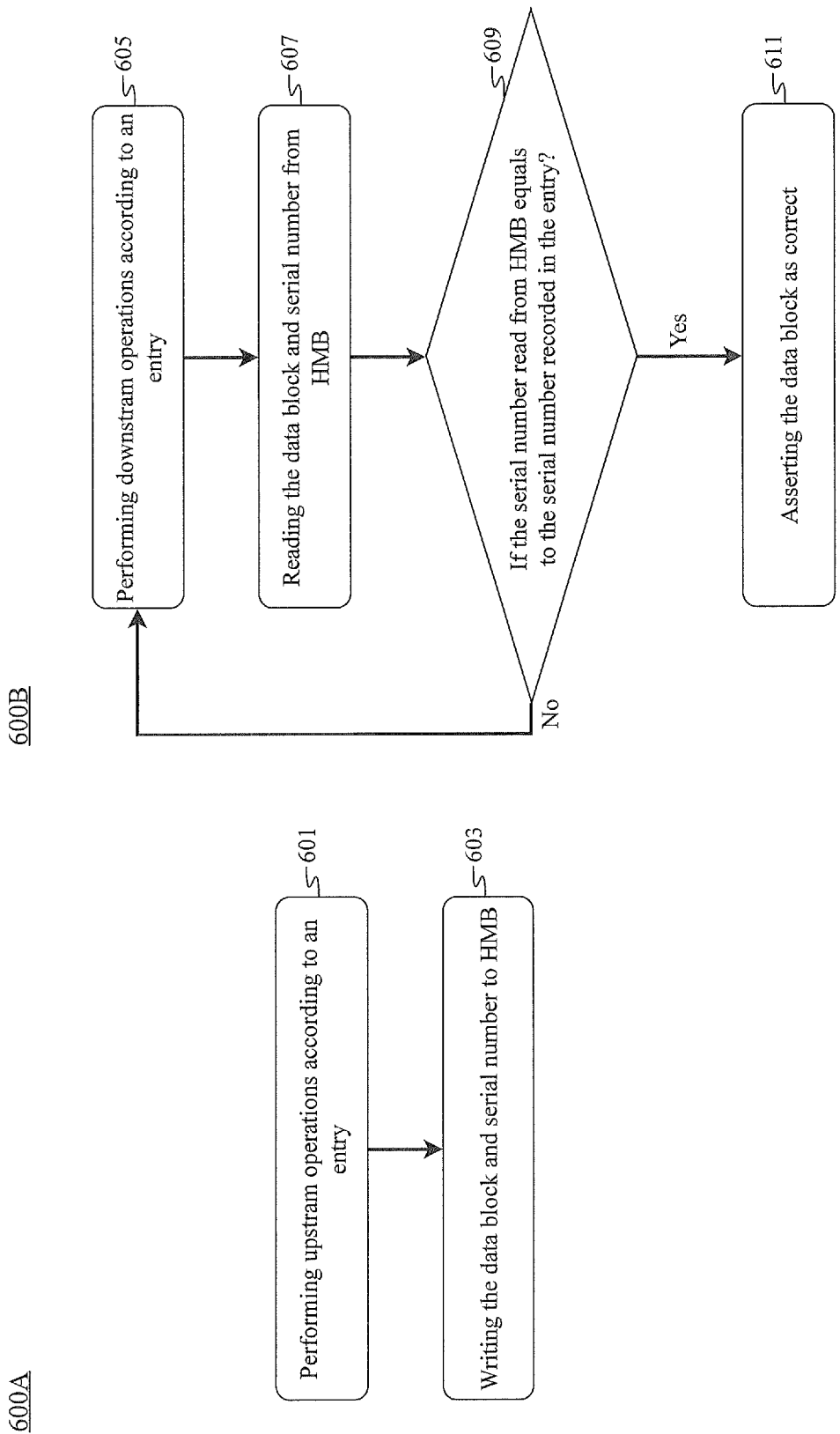
FIGS. 6A and 6B are flow charts illustrating methods of operating a data storage device in accordance with some embodiments of the present disclosure.

FIGS. 6A and 6B are flow charts illustrating methods of operating a data storage device in accordance with some embodiments of the present disclosure. FIG. 6A is the flow chart of method 600A and FIG. 6B is the flow chart of method 600B.

The method 600A may include operations 601 and 603. In operation 601, one or more upstream operations to the HMB may be performed according to an entry in the upstream DMA information array 510 (or according to the corresponding command). In operation 603, the corresponding data block and the serial number in the entry may be written to the HMB together.

In some embodiments of the method 600A, when one or more upstream operations to the HMB are performed according to an entry in the upstream DMA information array 510 (or according to the corresponding command), the serial number in the entry may be also written to the HMB. For example, when one or more upstream operations to the HMB are performed according to the entry 532 (or according to the command 312), the serial number of 0x0001 in the entry 532 may be written to the HMB at the HMB address 0xC000.

In some embodiments of the method 600A, the serial number in an entry may be added to the tail of the data block, which is generated based on the corresponding command. For example, the serial number of 0x0001 of the entry 532 may be added to the tail of the data block, which is generated based on the command 312.

The method 600B may include operations 605, 607, 609, and 611. In operation 605, one or more downstream operations to HMB are performed according to an entry in the downstream check information array 520 (or according to the corresponding command). In operation 607, the corresponding data block and the serial number may be read from the HMB together.

In some embodiments of the method 600B, when one or more downstream operations to HMB are performed according to an entry in the downstream check information array 520 (or according to the corresponding command), the serial number added to the tail of the data block may be read together. For example, when one or more downstream operations to HMB are performed according to the entry 535 (or according to the command 315), the serial number added to the tail of the data block may be read together.

In operation 609, it may be determined if the serial number read from the HMB is equal to the serial number in the corresponding entry. In some embodiments of the method 600B, once the data block and the serial number are read, it may be determined if the serial number read from the HMB is equal to the serial number in the corresponding entry. For example, once the data block and the serial number are read according to the entry 535 (or according to the command 315), it may be determined if the serial number read from the HMB is equal to the serial number of 0x0001 in the entry 535.

If the serial number read from the HMB is equal to the serial number recorded in the entry, operation 611 may be performed. In operation 611, the data block read together with the serial number may be asserted as correct. In some embodiments of the method 600B, when the serial number read from the HMB is equal to the serial number recorded in the corresponding entry in the downstream check information array 520, the data block read from the HMB may be asserted as correct. For example, when the serial number read from the HMB is equal to the serial number of 0x0001 in the entry 535, the data block read from the HMB may be asserted as correct.

If the serial number read from the HMB is equal to the serial number recorded in the entry, operation 605 may be performed. In some embodiments, performing of operation 605 may be delayed for a time period such that the related upstream operations can be finished.

In some embodiments of the method 600B, when the serial number read from the HMB is not equal to the serial number recorded in the corresponding entry in the downstream check information array 520, one or more downstream operations to HMB according to the corresponding entry (or according to the corresponding command) may be performed again. For example, when the serial number read from the HMB is not equal to the serial number of 0x0001 in the entry 535, one or more downstream operations to HMB according to the entry 535 (or according to the command 315) may be performed again. The downstream operations to HMB according to the entry 535 (or according to the command 315) performed for the second time may be delayed for a time period such that the related upstream operations according to the entry 532 (or according to the command 312) can be finished.

In some embodiments of the method 600B, one or more downstream operations to HMB according to an entry (or according to the corresponding command) may be performed until the serial number read from the HMB is equal to the serial number recorded in the entry. For example, one or more downstream operations to HMB according to the entry 535 (or according to the command 315) may be performed until the serial number read from the HMB is equal to the serial number of 0x0001 in the entry 535.

Figure 7:
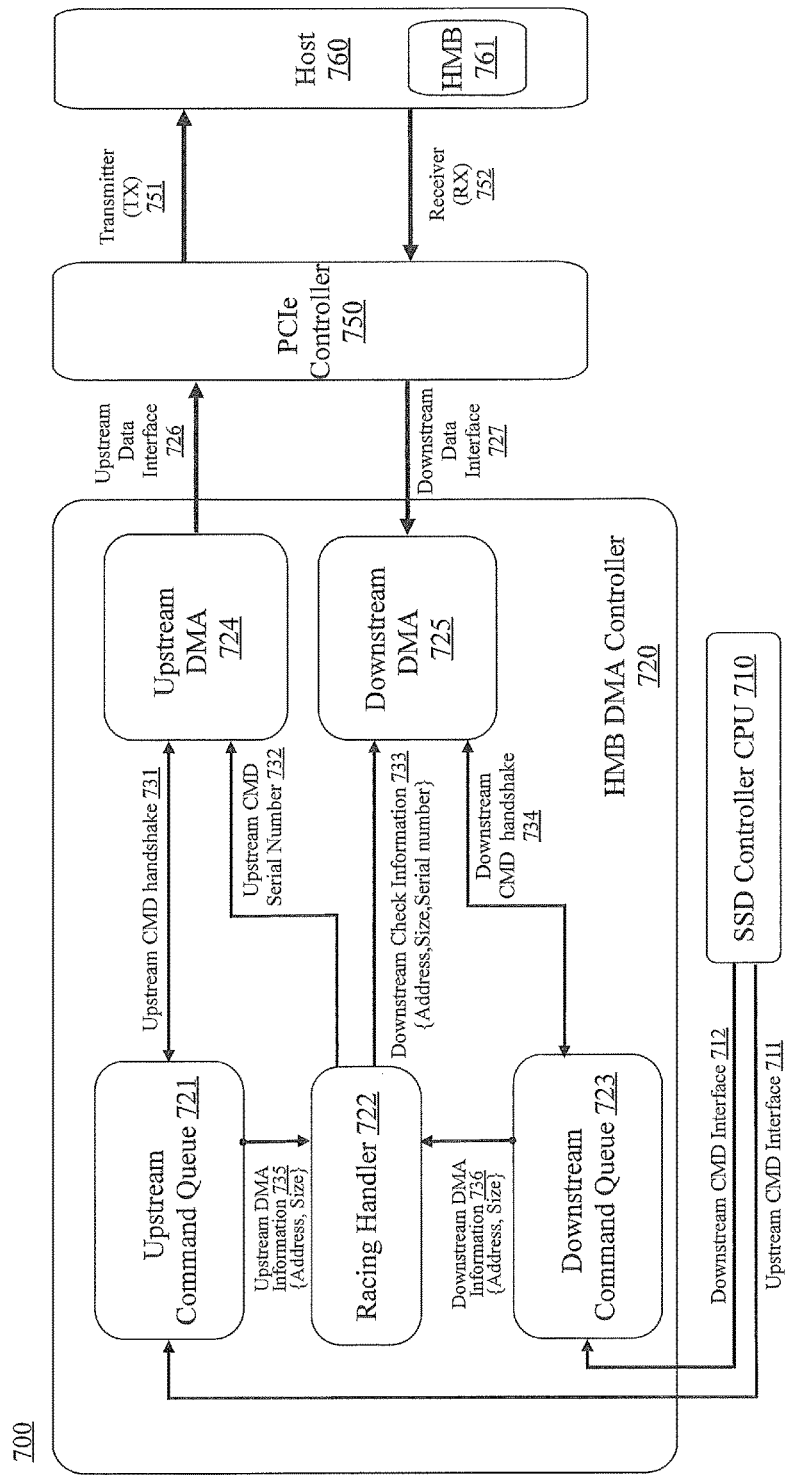
FIG. 7 is a block diagram illustrating controllers within a computer system including a data storage device in accordance with some embodiments of the present disclosure.

FIG. 7 is a block diagram illustrating controllers within a computer system 700 including a data storage device in accordance with some embodiments of the present disclosure. FIG. 7 may illustrate functional blocks of a computer system 700 including a data storage device. The data storage device may include the solid-state drive (SSD) controller CPU 710 and the host memory buffer (HMB) direct memory access (DMA) controller 720. The data storage device may include the SSD controller CPU 710, the HMB DMA controller 720, and the peripheral component interconnect express (PCIe) controller 750. The SSD controller CPU 710 and the HMB DMA controller 720 may be implemented by a controller of a data storage device (e.g., the controller 131 or the processor 220). The SSD controller CPU 710, the HMB DMA controller 720, and the PCIe controller 750 may be implemented by a controller of a data storage device (e.g., the controller 131 or the processor 220).

The SSD controller CPU 710 may transmit signals of upstream commands through the upstream command (CMD) interface 711. The signals of upstream commands from the SSD controller CPU 710 may be transmitted to the HMB DMA controller 720. The signals of upstream commands from the SSD controller CPU 710 may be transmitted to the upstream command queue 721. The upstream command queue 721 may have functions similar to those of upstream queue 320a.

The upstream command queue 721 may transmit upstream DMA information 735 to the racing handler 722. The upstream DMA information 735 may include the address and the data size for an upstream command (e.g., a new push-in upstream command). The address and the data size of the upstream DMA information 735 may be similar to the HMB address 511 and HMB size 512 in FIGS. 5A-5E.

The racing handler 722 may have functions to maintain an upstream DMA information array 510 and may have functions to record information of upstream commands in the upstream DMA information array 510.

The SSD controller CPU 710 may transmit signals of downstream commands through the downstream command (CMD) interface 712. The signals of downstream commands from the SSD controller CPU 710 may be transmitted to the HMB DMA controller 720. The signals of downstream commands from the SSD controller CPU 710 may be transmitted to the downstream command queue 723. The downstream command queue 723 may have functions similar to those of downstream queue 320*b*.

The downstream command queue 723 may transmit downstream DMA information 736 to the racing handler 722. The downstream DMA information 736 may include the address and the data size for a downstream command (e.g., a new push-in downstream command). The address and the data size of the downstream DMA information 736 may be similar to the HMB address 521 and HMB size 522 in FIGS. 5A-5E.

The racing handler 722 may have functions to maintain a downstream check information array 520 and may have functions to record information of downstream commands in the downstream check information array 520.

One or more upstream commands (CMD) may be popped from the upstream command queue 721 in sequence. The upstream command popped from the upstream queue 721 may be transmitted to the upstream DMA 724. The upstream command may be executed and processed by the upstream DMA 724. The upstream command handshake 731 may be performed between the upstream command queue 721 and the upstream DMA 724. For example, the upstream command may be popped from the upstream command queue 721, the popped upstream command may be executed and processed by the upstream DMA 724, and the upstream DMA 724 may report the result of the execution and process of the upstream command to the upstream command queue 721.

The racing handler 722 may maintain and update the upstream DMA information array 510 based on information of the upstream commands received from the upstream command queue 721. For example, the racing handler 722 may update or add entries in the upstream DMA information array 510, wherein each entry may include an address, data size, and a serial number. The entries in upstream DMA information array 510 may be maintained, updated, or added through the operations described in the embodiments of FIGS. 5A-5E.

The upstream command serial number 732 of the upstream command to be executed or processed in the upstream DMA 724 may be transmitted from the racing handler 722 to the upstream DAM 724. When the upstream DMA 724 receives the upstream command serial number 732, the upstream DMA 724 may transmit the corresponding data block and the upstream command serial number 732 to PCIe controller 750 such that the corresponding data block and the upstream command serial number 732 may be written to the HMB 761.

One or more downstream commands (CMD) may be popped from the downstream command queue 723 in sequence. The downstream command 733 popped from the downstream queue 723 may be transmitted to the downstream DMA 725. The downstream command may be executed and processed by the downstream DMA 725. The downstream command handshake 734 may be performed between the downstream command queue 723 and the downstream DMA 725. For example, the downstream command may be popped from the downstream command queue 723, the popped downstream command may be executed and processed by the downstream DMA 725, and the downstream DMA 725 may report the result of the execution and process of the downstream command to the downstream command queue 723. In some embodiments, the downstream DMA 725 may report whether the current downstream command will be executed or processed again through the downstream command handshake 734. Executing or processing the current downstream command may be caused by the mismatch between the serial number read from the HMB 761 and the serial number received from racing handler 722 (e.g., the downstream check information 733).

The racing handler 722 may maintain and update the downstream check information array 520 based on information of the downstream commands received from the downstream command queue 723. For example, the racing handler 722 may update or add entries in the downstream check information array 520, wherein each entry may include an address, data size, and a serial number. The entries in downstream check information array 520 may be maintained, updated, or added through the operations described in the embodiments of FIGS. 5A-5E. The serial numbers of the entries in the downstream check information array 520 may be updated or modified through the operations described in the embodiments of FIGS. 5A-5E.

The downstream check information 733 of the downstream command to be executed or processed in the downstream DMA 725 may be transmitted from the racing handler 722 to the downstream DMA 725. The downstream check information 733 may include an address, a data size, and a serial number of the downstream command to be executed or processed in the downstream DMA 725. The serial number in downstream check information 733 may be updated or modified to indicate a specific upstream command of which the access region overlap with the access region of the downstream command to be executed or processed in the downstream DMA 725.

When the downstream DMA 725 receives the downstream check information 733, the downstream DMA 725 may determine if the serial number read from the HMB 761 matches the serial number in the downstream check information 733. If the serial number read from the HMB 761 mismatches the serial number in the downstream check information 733, the corresponding downstream command may be executed or processed again. If the serial number read from the HMB 761 matches the serial number in the downstream check information 733, the downstream DMA 725 may report the downstream command queue 723 through the downstream command handshake 734 such that the next downstream command in the downstream command queue 723 may be popped. The downstream check information 733 may be used through the operations described in the embodiments of FIG. 6B.

After the upstream command in the upstream DMA 725 is executed or processed, the corresponding command and data may be transmitted to PCIe controller 750. The corresponding command may be transmitted to the PCIe controller 750 through a signaling interface, and the corresponding data block may be transmitted to the PCIe controller 750 through the upstream data interface 726. In some embodiments, after the upstream command in the upstream DMA 724 is executed or processed, the corresponding command and data block may be transmitted to a corresponding interface controller when the data storage device (including the SSD controller CPU 710 and HMB DMA controller 720) is connected to the host 760 with any communication protocols using at least one of the standards associated with the Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), Nonvolatile Memory Express (NVMe), Universal Flash Storage (UFS), Secure Digital (SD), Multi-Media Card (MMC), embedded MMC (eMMC).

The PCIe controller 750 may transmit a corresponding command and data block for the upstream operation to the host 760. The corresponding command may be transmitted to the host 760 through a signaling interface, and the corresponding data block may be transmitted to the host 760 through the transmitter 751. Upon receiving the corresponding command and data block for the upstream operation, the host 760 may write corresponding data block at designated addresses of the HMB 761. In some embodiments, the corresponding data block for the upstream operation transmitted to the host 760 may be directly write at designated addresses of the HMB 761 through a bus within the host 760.

After the downstream command in the downstream DMA 725 is executed or processed, the corresponding command may be transmitted to the peripheral component interconnect express (PCIe) controller 750, and the corresponding data block may be received from the PCIe controller 750. The corresponding command may be transmitted to the PCIe controller 750 through a signaling interface, and the corresponding data block may be received from the PCIe controller 750 through the downstream data interface 727. In some embodiments, after the downstream command in the downstream DMA 725 is executed or processed, the corresponding command may be transmitted to a corresponding interface controller when the data storage device (including the SSD controller CPU 710 and HMB DMA controller 720) is connected to the host 760 with any communication protocols using at least one of the standards associated with the Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), Nonvolatile Memory Express (NVMe), Universal Flash Storage (UFS), Secure Digital (SD), Multi-Media Card (MMC), embedded MMC (eMMC), and the corresponding data block may be received from the corresponding interface controller.

The PCIe controller 750 may transmit a corresponding command for the downstream operation to the host 760. The PCIe controller 750 may receive corresponding data for the downstream operation from the host 760. The corresponding command may be transmitted to the host 760 through a signaling interface, and the corresponding data block may be received from the host 760 through the receiver 752. Upon receiving the corresponding command for the downstream operation, the host 760 may read corresponding data at designated addresses of the HMB 761 and transmit the corresponding data block to the PCIe controller 750. In some embodiments, the corresponding data for the downstream operation transmitted to the PCIe controller 750 may be directly read at designated addresses of the HMB 761 through a bus within the host 760.

Figure 8:
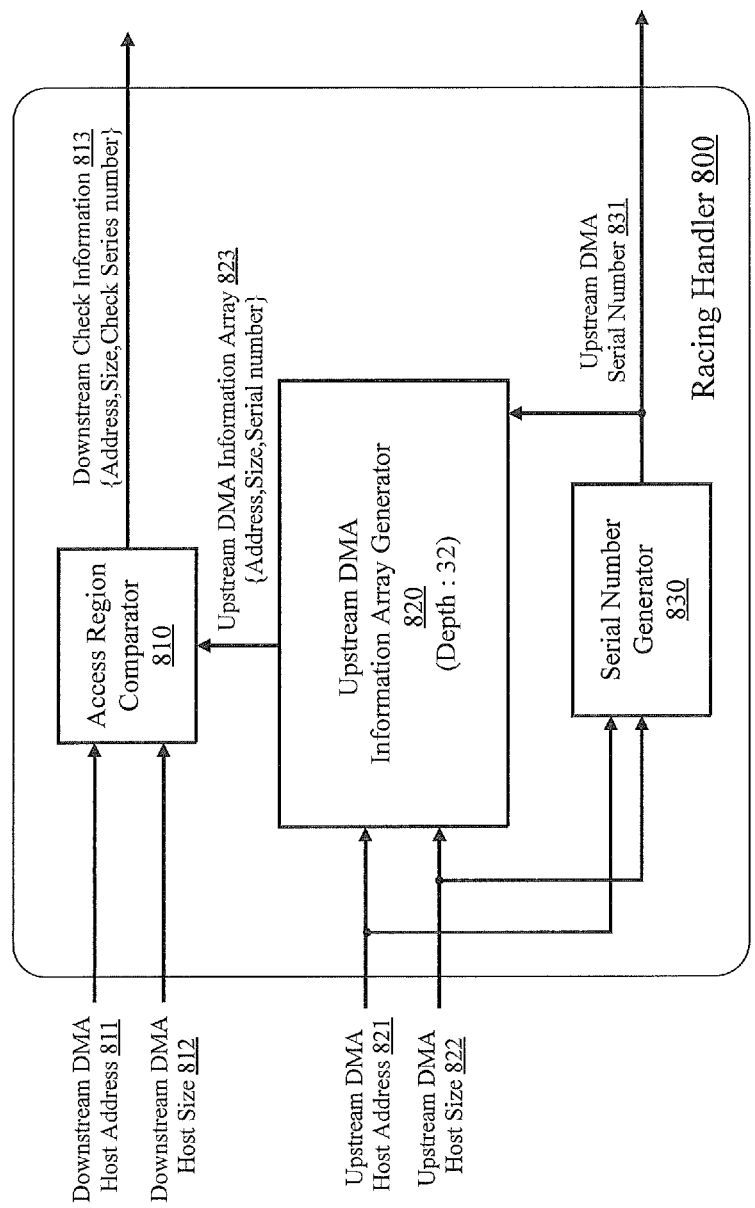
FIG. 8 is a block diagram illustrating an order handler in accordance with some embodiments of the present disclosure.

FIG. 8 is a block diagram illustrating a racing handler 800 in accordance with some embodiments of the present disclosure. FIG. 8 may illustrate functional blocks of a racing handler 800. The racing handler 722 may be implemented using the order handler 800. The order handler 800 may be implemented by a controller of a data storage device (e.g., the controller 131 or the processor 220).

The inputs of the order handler 800 may include a downstream DMA host address 811, a downstream DMA host size 812, an upstream DMA host address 821, and an upstream DMA host size 822. An upstream DMA host address 821 and an upstream DMA host size 822 may be received from the upstream command queue 721. A downstream DMA host address 811 and a downstream DMA host size 812 may be received from the downstream command queue 723. The downstream DMA host address 811 may indicate the address to be read of the HMB within the host. The upstream DMA host address 821 may indicate the address to be written of the HMB within the host. The downstream DMA host size 812 may indicate the data size to be read. The upstream DMA host size 822 may indicate the data size to be written.

The upstream DMA host address 821 and the upstream DMA host size 822 may be input to the serial number generator 830. The serial number generator 830 may generate an upstream DMA serial number 831 for the corresponding upstream command. In some embodiment the upstream DMA serial number 831 may be assigned in sequence. The upstream DMA serial number 831 may be assigned through the operations for assigning serial number 513 as described in the embodiments of FIGS. 5A-5E. The upstream DMA serial number 831 may be output to the upstream DMA 724 as shown in FIG. 7. The upstream DMA serial number 831 may be input to an upstream DMA information array 820.

The upstream DMA information array generator 820 may generate, maintain, or update an upstream DMA information array 823. The upstream DMA information array 823 may have a depth of 32 entries. Each entry of the upstream DMA information array 823 may include an address, a size, and a serial number, in which the address, the size, and the serial number may be similar to the HMB address 511, the HMB size 512, and the serial number 513 as shown in FIGS. 5A-5E. The upstream DMA host address 821, the upstream DMA host size 822, and the upstream DMA serial number 831 may be input to the upstream DMA information array generator 820. The upstream DMA information array 823 may be similar to the upstream DMA information array 510. The upstream DMA information array 823 may be generated, maintained, or updated through the operations for updating the upstream DMA information array 510 as described in the embodiments of FIGS. 5A-5E.

The downstream DMA host address 811, the downstream DMA host size 812, and the upstream DMA information array 823 may be input to an access region comparator 810. Through the access region comparator 810, the access region according to the downstream DMA host address 811 and the downstream DMA host size 812 may be compared to the access regions defined by the entries of the upstream DMA information array 823. If the access region according to the downstream DMA host address 811 and the downstream DMA host size 812 overlap with the access regions defined by the address and the data size of an entry of the upstream DMA information array 823, the serial number for the downstream DMA host address 811 and the downstream DMA host size 812 may be assigned the same as the serial number of the entry of the upstream DMA information array 823. A serial number for a downstream command associated with the downstream DMA host address 811 and the downstream DMA host size 812 may be assigned through the operations for assigning serial number 523 as described in the embodiments of FIGS. 5A-5E.

Downstream check information 813 may be generated from the access region comparator 810. The downstream check information 813 may include an address, a size, and a serial number, in which the address, the size, and the serial number may be similar to the HMB address 521, the HMB size 522, and the serial number 523 as shown in FIGS. 5A-5E. The downstream check information 813 may be output to the upstream DMA 724 as shown in FIG. 7.

Figure 9:
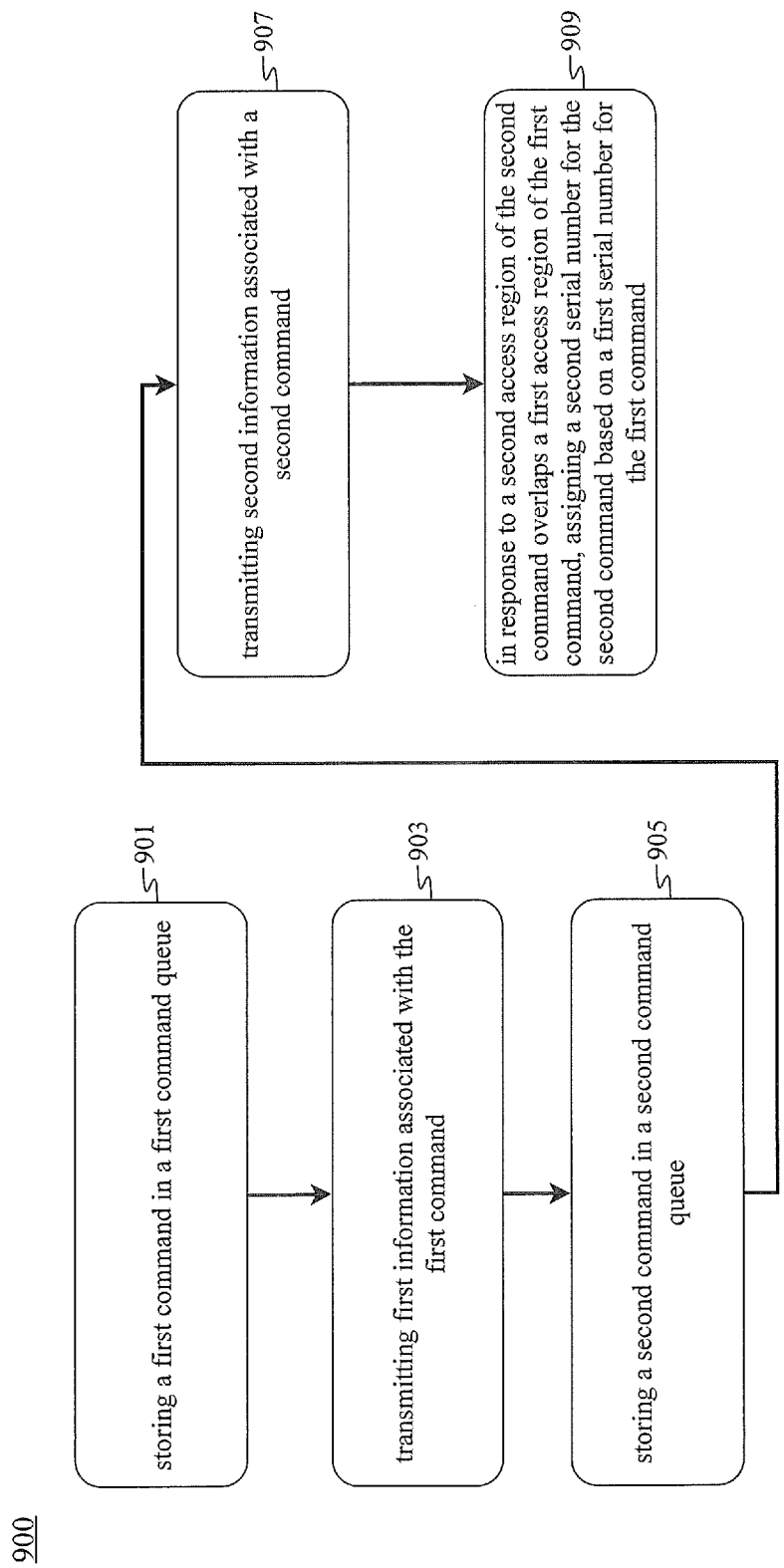
FIG. 9 is a flow chart illustrating a method of operating a data storage device in accordance with some embodiments of the present disclosure.

FIG. 9 is a flow chart illustrating a method 900 of operating a data storage device in accordance with some embodiments of the present disclosure. The method 900 described in FIG. 9 may be performed by the SSD controller CPU 710, the HMB DMA controller 720, the controller 131, and/or the processor 220.

In operation 901, a first command may be stored in a first command queue. The first command may be received from a processor. The processor may be the SSD controller CPU 710, and the corresponding operations may be performed by the HMB DMA controller 720. The first command queue may be maintained in the HMB DMA controller 720. The first command may be an upstream command. In some embodiments, the first command may be a direct memory access command of the data storage device. The first command queue may be an upstream queue. The first command queue may be the upstream command queue 721 or the upstream queue 320a.

In operation 903, first information associated with the first command may be transmitted. The first information may be transmitted to an interface controller. In some embodiment, the interface controller may be the PCIe controller 750 or an interface controller supporting the interface for connecting the data storage device. The first command may be associated with a first serial number. The first serial number may indicate order of the first information associated with the first command to be transmitted to the interface controller.

In operation 905, a second command may be stored in a second command queue. The second command may be received from the processor after the first command. The second command queue may be maintained in the HMB DMA controller 720. The second command may be a downstream command. In some embodiments, the second command may be a direct memory access command of the data storage device. The second command queue may be a downstream queue. The second command queue may be the upstream command queue 722 or the upstream queue 320b.

In operation 907, second information associated with the second command may be transmitted. The second information may be transmitted to an interface controller. In some embodiment, the interface controller may be the PCIe controller 750 or an interface controller supporting the interface for connecting the data storage device.

In operation 909, in response to a second access region of the second command overlapping a first access region of the first command, a second serial number may be assigned for the second command based on the first serial number of the first command. The second serial number may be assigned by a racing handler (e.g., the racing handler 722 or 800).

In some embodiments, the method 900 may further comprise: storing a third command received from the processor in the first command queue; transmitting third information associated with the third command to the interface controller; and in response to the second access region of the second command overlapping a third access region of the third command in the first command queue, updating the second serial number for the second command based on the third serial number of the third command. The third command may be stored after the first command. The third command may be associated with a third serial number. The third serial number may indicate order of the third information associated with the third command to be transmitted to the interface controller.

In some embodiments, the method 900 may further comprise: receiving a data block including a fourth serial number in response to the second command; and in response to the fourth serial number not corresponding to the second serial number of the second command, discarding the data block and re-transmitting the second information associated with the second command.

In some embodiments, the method 900 may further comprise: receiving a data block including a fourth serial number in response to the second command; and in response to the fourth serial number corresponding to the second serial number of the second command, removing the second command from the second command queue.

In some embodiments of the method 900, the first access region may correspond to a portion of a memory of a host to be accessed by the storage device. The second region may correspond to a portion of the memory of the host to be access by the storage device.

In some embodiments of the method 900, the first access region of the first command may be defined by a first memory address and a first data size included in the first command. The second access region of the second command may be defined by a second memory address and a second data size included in the second command.

Figure 10:
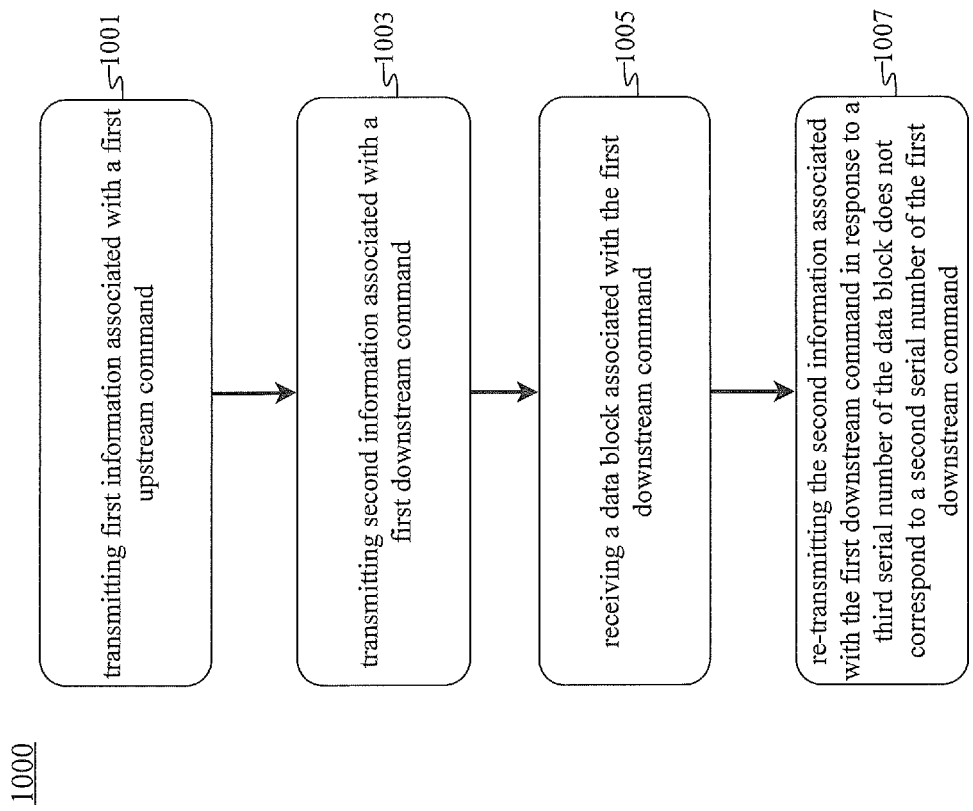
FIG. 10 is a flow chart illustrating a method of operating a data storage device in accordance with some embodiments of the present disclosure.

FIG. 10 is a flow chart illustrating a method 1000 of operating a data storage device in accordance with some embodiments of the present disclosure. The method 1000 described in FIG. 10 may be performed by the SSD controller CPU 710, the HMB DMA controller 720, the controller 131, and/or the processor 220.

In operation 1001, first information associated with a first upstream command may be transmitted. The first upstream command may be associated with a first serial number. The first serial number may indicate order of the first information to be transmitted. The first information may be transmitted to an interface controller. In some embodiment, the interface controller may be the PCIe controller 750 or an interface controller supporting the interface for connecting a data storage device to a host. The first upstream command may be received from a processor. The processor may be the SSD controller CPU 710, and the corresponding operations may be performed by the HMB DMA controller 720.

In operation 1003, second information associated with a first downstream command may be transmitted after transmitting the first information. The first downstream command may be associated with a second serial number. The second serial number may correspond to the first serial number. The second information may be transmitted to the interface controller. The first downstream command may be received from the processor.

In operation 1005, a data block associated with the first downstream command may be received. The data block may be received from the host which is connected to the data storage device. The data block may comprise a third serial number.

In operation 1007, the second information associated with the first downstream command may be re-transmitted in response to a third serial number of the data block not corresponding to a second serial number of the first downstream command.

In some embodiments, the method 1000 may further comprise: discarding the received data block in response to the third serial number of the data block not corresponding to the second serial number of the first downstream command. The method 100 may further comprise: removing the first downstream command from a command queue in response to the third serial number of the data block corresponding to the second serial number of the second command. The command queue may be a downstream command queue (e.g., the downstream command queue 320b or 723).

In some embodiments of the method 1000, a first access region of the first upstream command may overlap a second access region of the first downstream command. The first access region may correspond to a portion of a memory of a host to be accessed by the storage device. The second region may correspond to a portion of the memory of the host to be access by the storage device. The first access region of the first command may be defined by a first memory address and a first data size included in the first upstream command. The second access region of the second command may be defined by a second memory address and a second data size included in the first downstream command.

In some embodiments of the method 1000, the first upstream command may be a direct memory access command of the data storage device. The first downstream command may be a direct memory access command of the data storage device.

It should be noted that the above disclosure is for illustrative purposes and should not be deemed as limiting the present disclosure. Those skilled in the art will readily observe that numerous modifications and alterations of the device and method may be made while retaining the teachings of the present disclosure. Accordingly, the above disclosure should be construed as limited only by the metes and bounds of the appended claims.

What is claimed is:

1. A disk drive controller of a storage device, comprising:
    an interface controller;
    a memory controller; and
    a processor configured to transmit commands to the memory controller;
    the memory controller coupled between the interface controller and the processor and comprising:
        a first command queue;
        a second command queue; and
        a racing handler,
    wherein the memory controller is configured to:
        store a first command received from the processor in the first command queue;
        transmit, to the interface controller, first information associated with the first command, wherein the first command is associated with a first serial number, and the first serial number indicates the order in which the first information is transmitted to the interface controller;
        store a second command received from the processor in the second command queue;
        transmit, to the interface controller, second information associated with the second command, wherein the second command is received from the processor after the first command;
        in response to a second access region of the second command overlapping a first access region of the first command, assign a second serial number to the second command by the racing handler, wherein the second serial number is equal to the first serial number.

2. The disk drive controller of claim 1, wherein the memory controller is further configured to:
    store a third command received from the processor in the first command queue, wherein the third command is stored after the first command;
    transmit, to the interface controller, third information associated with the third command, wherein the third command is associated with a third serial number, and the third serial number indicates the order in which the third information is transmitted to the interface controller; and
    in response to the second access region of the second command overlapping a third access region of the third command in the first command queue, update the second serial number of the second command to be equal to the third serial number.

3. The disk drive controller of claim 1, wherein the memory controller is further configured to:
    receive a data block including a fourth serial number in response to the second command; and
    in response to the fourth serial number not corresponding to the second serial number of the second command, discard the data block and re-transmit the second information associated with the second command to the interface controller.

4. The disk drive controller of claim 1, wherein the memory controller is further configured to:
    receive a data block including a fourth serial number in response to the second command; and
    in response to the fourth serial number corresponding to the second serial number of the second command, remove the second command from the second command queue.

5. The disk drive controller of claim 1, wherein the first and second access regions correspond to portions of a memory of a host to be accessed by the storage device.

6. The disk drive controller of claim 1, wherein the first access region of the first command is defined by a first memory address and a first data size included in the first command, and the second access region of the second command is defined by a second memory address and a second data size included in the second command.

7. The disk drive controller of claim 1, wherein the first command queue includes an upstream command queue, and the second command queue include a downstream command queue.

8. The disk drive controller of claim 1, wherein the first command includes an upstream command, and the second command includes a downstream command.

9. The disk drive controller of claim 1, wherein the first and second commands include direct memory access commands of the storage device.

10. The disk drive controller of claim 1, wherein the interface controller is a peripheral component interconnect express (PCIe) interface controller.

11. A storage device including the disk drive controller of claim 1.

12. A method for operating a storage device, comprising:
    transmitting first information associated with a first upstream command, the first upstream command associated with a first serial number, the first serial number indicating order of the first information to be transmitted, the first information including first memory address and first data size associated with the first upstream command;

after transmitting the first information, transmitting second information associated with a first downstream command, the first downstream command associated with a second serial number, wherein the second serial number is assigned to be equal to the first serial number, the second information including second memory address and second data size associated with the first downstream command, a first access region of the first upstream command overlaps a second access region of the first downstream command;

receiving a data block associated with the first downstream command, the data block comprising a third serial number; and re-transmitting the second information associated with the first downstream command in response to the third serial number of the data block not corresponding to the second serial number of the first downstream command.

13. The method of claim 12, further comprising:

discarding the received data block in response to the third serial number of the data block not corresponding to the second serial number of the first downstream command.

14. The method of claim 12, further comprising:

removing the first downstream command from a command queue in response to the third serial number of the data block corresponding to the second serial number of the second command.

15. The method of claim 12, wherein the first and second access regions correspond to portions of a memory of a host to be accessed by the storage device.

16. The method of claim 12, wherein the first access region of the first upstream command is defined by a first memory address and a first data size included in the first upstream command, and the second access region of the first downstream command is defined by a second memory address and a second data size included in the first downstream command.

17. The method of claim 12, wherein the first upstream command and the first downstream command include direct memory access commands of the storage device.

18. The method of claim 12, wherein a host and the storage device are connected through a peripheral component interconnect express (PCIe) interface.

* * * * *